US010675544B2

(12) United States Patent
Stroud

(10) Patent No.: US 10,675,544 B2
(45) Date of Patent: Jun. 9, 2020

(54) PERSONALIZED USER INTERFACE BASED ON IN-APPLICATION BEHAVIOR

(71) Applicant: Sony Interactive Entertainment LLC, San Mateo, CA (US)

(72) Inventor: Micah S. Stroud, Sunnyvale, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 15/703,697

(22) Filed: Sep. 13, 2017

(65) Prior Publication Data

US 2018/0280802 A1 Oct. 4, 2018

Related U.S. Application Data

(60) Provisional application No. 62/480,258, filed on Mar. 31, 2017.

(51) Int. Cl.
| | |
|---|---|
| *A63F 13/12* | (2006.01) |
| *A63F 13/63* | (2014.01) |
| *A63F 13/79* | (2014.01) |
| *A63F 13/5375* | (2014.01) |
| *A63F 13/497* | (2014.01) |

(Continued)

(52) U.S. Cl.
CPC ............ *A63F 13/63* (2014.09); *A63F 13/355* (2014.09); *A63F 13/497* (2014.09); *A63F 13/533* (2014.09); *A63F 13/5375* (2014.09); *A63F 13/67* (2014.09); *A63F 13/79* (2014.09); *A63F 2300/308* (2013.01); *A63F 2300/535* (2013.01);

(Continued)

(58) Field of Classification Search
CPC ........ A63F 13/497; A63F 13/67; A63F 13/69; A63F 13/79; A63F 13/798; A63F 13/86; A63F 13/87; A63F 2300/6018; A63F 2300/6027

See application file for complete search history.

(56) References Cited

U.S. PATENT DOCUMENTS

| | | | |
|---|---|---|---|
| 8,622,839 B1 * | 1/2014 | McKenzie | ............ A63F 13/355 463/42 |
| 8,764,561 B1 * | 7/2014 | Lan | ......................... A63F 13/12 463/31 |

(Continued)

OTHER PUBLICATIONS

ISR, PCT/US2018022762, dated May 30, 2018, 3 pages.

(Continued)

*Primary Examiner* — Lawrence S Galka
(74) *Attorney, Agent, or Firm* — Penilla IP, APC

(57) ABSTRACT

Methods and systems to provide a user interface to access games available for a user account. Selection of a game for game play is detected at the user interface and, in response, a game play is initiated. Interactions provided by a user during game play are used to affect an outcome of the game. The interactions are analyzed to determine game behavior of the user. Behavior metrics are generated for different portions of the game, based on the user's game behavior. The behavior metrics for the user for the game are associated with a game icon of the game provided on the user interface, the association causes specific ones of the behavior metrics to be rendered for the different portions of the game during subsequent game play and are provided to help the user to improve the user's game play for the different portions of the game.

25 Claims, 13 Drawing Sheets

(51) Int. Cl.
*A63F 13/355* (2014.01)
*A63F 13/533* (2014.01)
*A63F 13/67* (2014.01)

(52) U.S. Cl.
CPC . *A63F 2300/552* (2013.01); *A63F 2300/5546* (2013.01)

(56) References Cited

U.S. PATENT DOCUMENTS

| | | |
|---|---|---|
| 2012/0276992 A1 | 11/2012 | Moinuddin et al. |
| 2014/0179425 A1 | 6/2014 | Perry et al. |
| 2014/0179428 A1 | 6/2014 | Miura et al. |
| 2014/0187314 A1* | 7/2014 | Perry ................. A63F 13/10 463/29 |
| 2014/0255881 A1 | 9/2014 | Rom et al. |
| 2016/0045828 A1* | 2/2016 | Bowron ............. A63F 13/497 463/31 |
| 2016/0107086 A1* | 4/2016 | Baszucki ............. A63F 13/79 463/42 |
| 2017/0182426 A1* | 6/2017 | Loeb .................. A63F 13/30 |

OTHER PUBLICATIONS

Brian A Smith et al, "Mining Controller Inputs to Understand Gameplay" Columbia University, New York, NY, USA brian,nayar @cs.columbia.edu, pp. 157-168.

Min, Wookhee, "Generalized Goal Recognition Framework for Open-World Digital Games", Retrieved from the Internet: URL:https://repository.lib.ncsu.edu/handle/1840.16/11426, retrieved on Jan. 17, 2018 abstract.

* cited by examiner

PERSONALIZED USER INTERFACE BASED ON IN-APPLICATION BEHAVIOR

CLAIM OF PRIORITY

The present application claims priority to and benefit of the commonly owned provisional patent application No. 62/480,258 filed on Mar. 31, 2017, and entitled "Personalized User Interface based on In-Application Behavior," which is incorporated herein by reference in its entirety.

BACKGROUND

Field

The present disclosure relates to systems and methods for providing games for user interaction, and more specifically to providing a user interface with options to view details of game play. In some examples, user game play interactions are collected and analyzed in order to generate a personalized user interface (UI) and/or user experience design (UX). Examples are described regarding ways to change a main UI/UX interface after a user leaves an application to best assist the user in getting back into the application (e.g., action of the game). In some examples, specific user interaction data is captured during game play/use of the application, which is then analyzed to identify hints and/or assistance to the user's subsequent game play or use of the application.

Description of the Related Art

One of the rapidly growing technologies is in the field of cloud gaming where users are able to access a number of games available on a cloud gaming site over a network, such as the Internet, and begin playing the game. A user accesses his/her account on the cloud gaming site and selects a game from a list of games that are available for the user account, for game play. When the user selects a game for game play from the cloud gaming site, using a client device, a server in the cloud gaming site starts a session of game play and begins streaming the video frames of the game to the client device from which the user accessed the cloud gaming site. When the user exits the game play session before completing the game, the game play is paused and the game data is stored as metadata to enable re-starting of the game from where the user left off. The game data that is captured includes actions taken, results obtained, points scored, hurdles crossed, enemies captured or overcome, game tools captured, spent or awarded, communications with friends, game clips shared, mini-games generated, etc. However, when the user re-starts the game, the game logic merely loads the game for game play. There is no easy way to reconstruct all the details of the game play (in-game messages between friends/buddies/play partners, details of chats, game statistics, etc.), provided in the metadata and render it to the user, when the user re-starts the game.

Further, the user interface provided by the game logic is same for every user. The user interface is not customized for each user and there is no easy way to obtain all the details of game play for a user. Still further, the user interface does not show any extra gameplay metadata about the in-game communications and other social interactions conducted during game play or any other details of the game session. When a new user begins playing the game, the user may not be well versed with all the actions that need to be taken to overcome challenges or hurdles in the game. This causes a lot of frustration to a user as the user is not able to accomplish what he wants in the game, causing him to leave the game without having a satisfactory user experience.

It would be advantageous if the user can be provided with options to view specific ones of the behavior metrics for the user before or during game play and to allow the user to view game state of a prior game play of the game played by the user without having to navigate through multiple menus. It would also be advantageous if the user is allowed to view game play of other users to allow the user to improve his/her game playing skills.

It is within this context that embodiments of the invention arise.

SUMMARY OF THE INVENTION

Embodiments of the present invention disclose methods, systems and computer readable media for updating a user interface with options to enable a user of a game to view details of prior game play of the user or of other users. The user interface provides access to a plurality of games that are available on a cloud game server, for a user account. Although discussion is provided herein regarding a cloud game server, it should be understood that any game or application computing system may use and benefit from the processing described herein. By way of example, other computing system may include game consoles, personal computer, mobile user devices, tablets, display screens, televisions, personal computer systems, servers, virtual machines, etc., that are local and remotely located. Furthermore, it should be understood that the various embodiments are not restricted to video game applications but any interactive application (e.g., app) may utilize the functionality described herein. Thus, reference to games should not be considered as limiting the scope to games, and any type of application may use some or all of the features described herein.

In one embodiment, when access is provided to a game site or application, a user interface may provide behavior metrics that are customized for the user for each game that the user is viewing or playing. These behavior metrics provide game state of the game and hints to allow the user to improve his game play. In some examples, user game play interactions are collected and analyzed in order to generate a personalized user interface (UI) and/or user experience design (UX). Examples are described regarding ways to change a main UI/UX interface after a user leaves an application to best assist the user in getting back into the action of the game. In some examples, specific user interaction data is captured during game play/movements in the application, which is then analyzed to identify appropriate hints and/or provide customized assistance to the user's subsequent game play. Providing this type of assistance to user reduces user frustration with games/application, and may lead to improving user engagement with the application/game.

In one embodiment, when a user selects a game for game play (i.e., application for user interaction), user interactions during game play are recorded in metadata. After a user exits a game session of the game application, the user interface is updated to include options providing details of the game play session, such as game state (in textual or image or video format), game statistics, hints and/or other assistance to help the user to improve his/her own game play of the game during subsequent game play sessions. The hints may be provided in different formats including audio format, video format, textual format, etc., and may include details of steps to take, sequence of button presses to make, a video clip of a different user that played and completed the game or achieved completion metrics for parts of the game, levels of the game or the game, etc. The various hints are provided using the details recorded in the metadata, so as to keep the user engaged and interested in game play while allowing the user to have a satisfying game play experience.

In some embodiments, during use of an application/game, a process is executed to capture data and/or metadata that may be used for real-time analysis. The real-time analysis is usable to identify or quantify the user's behaviors when playing the game or interacting with an application. This information can be used to add or remove hints for the user for future play of the game or interaction with the application. Some of these hints can be dynamically generated immediately after the user ends interaction with the application or game. The information provided can include user activities, profiling of the user activities or actions, history data regarding application interaction, community data regarding the same game or application, etc. In some embodiments, machine learning is used to process the user's interactions and to provide suggestions for further application interaction, or provide hints or suggestions for interacting with the application. In some cases, the information is used to keep the user engaged with the application.

In some cases, the application may be a television interface that allows the user to select channels, watch content, save content, record content, share content, and generally interact with television (live or recorded) content. Based on these interactions, learning of the user's actions will enable presentation of usable data related to past interactions. This useful data can be used by the user to re-engage with the application, and make more informed selections that will provide improved use and/or navigations with the application. In one embodiment, the television interface relates to an online television service that allows users to access live and recorded television broadcasts. The online television service, in one embodiment, will allow the user to select channels, play games, record broadcasts, and watch television from any mobile device, etc. In some configurations, one or more services of a cloud processing service executes the television service, and users can connect to the service via a computing device. The computing device may include a game console, a USB connected stick, a computer integrated in a television display, a mobile device, a laptop, etc. Thus, once a user ends a television interaction session, the user may be provided with useful information via a UI/UX interface, and with options that may be used for continued watching or interactions. As noted, machine learning can be implemented to process the interactions either on a local computer or on a server. This processing can be performed in substantial real-time, and the useful information and/or hints can be used by the user in an efficient manner, e.g., to continue watching or playing, instead of ending a session or losing interest.

In one embodiment, a method is provided. The method is executed by a cloud game server of a cloud gaming system. The method includes providing a user interface for a user account. The user interface is used to access games available on the cloud game server. Each game presented on the user interface includes a corresponding game icon of the game and one or more options for accessing behavior metrics generated using interactions provided during game play of the game. The behavior metrics may be from the user's own prior game play(s) or may be of other users that played the game. The method also includes detecting selection of a game for game play, from the user interface. In response to detecting selection, a game play of the game is instantiated and interactions provided by a user during game play are used to affect an outcome of the game. The interactions provided by the user are analyzed to determine game behavior of the user. Based on the user's game behavior, behavior metrics are generated for the game, wherein the behavior metrics are different for different portions of the game based on the game behavior of the user in the respective portions. The behavior metrics for the user for the game are associated with a game icon of the game provided on the user interface so as to cause specific ones of the behavior metrics to be rendered for the different portions of the game during subsequent game play. The behavior metrics dynamically change based on change in the game play of the different portions of the game that is currently providing interactive content and the behavior metrics are provided to help the user to improve the user's game play for the different portions of the game.

In some embodiments, the operations of analyzing and generating are performed upon detecting end of a current game play session by the user.

In some embodiments, selection of the game at the user interface causes an image clip of a game state of a prior game play of the user to be rendered at the user interface.

In some embodiments, the behavior metrics of the user are updated on the user interface upon detecting selection of the game for subsequent game play.

In some embodiments, the behavior metrics for the user include game hints that are provided to assist the user during subsequent game play, wherein the hints are identified from game logic of the game.

In some embodiments, a game model for the game is generated using the game behavior of the user from prior game play and game inputs defined in the game logic. Any deviation in the user's game behavior during the game is identified by comparing the user's interactions for each portion of the game using details from the game model with game inputs defined by the game logic for the respective portion of the game, wherein the deviation results in the user not successfully completing the portion of the game or achieving a completion metric for the portion, sub-portion, event, action, level, the entire game, or sequence in the game. Game hints are provided for the game using the game inputs defined in the game logic.

In some embodiments, a game model for the game is generated using the game behavior of a plurality of users that played the game, the game behavior of the user from prior game play and game inputs defined in the game logic. Any deviation in the user's game behavior for a portion of the game is identified by comparing the user's interactions with the interactions of the plurality of other users that successfully completed the game or achieved a completion metric for at least part of the game, a sequence of events, actions, levels, moves, or combinations thereof. A specific other user's game play is selected based on skill level of the user, the game behavior of the user or by matching a portion of a user profile of the specific other user with a corresponding profile portion of the user, and game hints are provided for the portion of the game using interactions provided for the portion by the specific other user. The game hints are customized for the user based on the user's game behavior.

In some embodiments, a video clip for the portion of the game is provided in the game hints, wherein the video clip is extracted from the specific other user's game play.

In some embodiments, the game selected for game play is a multi-user game played by a plurality of users and the behavior metrics generated for each of the plurality of users is rendered at the user interface of the respective users.

In some embodiments, the behavior metrics are presented in accordance to presentation preference defined by the user.

In some embodiments, the game selected for game play is a multi-user game played by a plurality of users, wherein the user interface for each of the plurality of users includes an option to restart the game play of the game.

In some embodiments, the hints are provided in one of a video format or a textual format or an audio format or a combination of any two or all of the video, textual, and audio formats.

In some embodiments, the user interface includes an option to customize the game for game play. The option to customize includes option to adjust speed of the game or a level of the game or a difficulty of the game for subsequent game play.

In an alternate embodiment, a method is provided. The method is executed by a cloud game server of a cloud gaming system. The method includes providing a user interface to access games available for a user account on the cloud game server. Selection of a game for current game play is detected from the user interface. Interactions provided by a user in a portion of the game during current game play, is identified. A model is generated for the game using interactions provided by the user during prior game play and game inputs specified in the game logic of the game. The interactions provided in the current game play are analyzed using the model generated for the prior game play to determine game behavior of the user. Behavior metrics for the current game play of the user is generated based on the game behavior of the user, wherein the behavior metrics provide hints or comments for improving game play of the user. The behavior metrics are dynamically adjusted to correspond with change in current game play. The behavior metrics are associated to a game icon of the game presented on the user interface. The association causes specific ones of the behavior metrics to render at the user interface for different portions of game during current game play. The behavior metrics dynamically change in response to change in the game currently rendering and are provided to help the user to improve the user's current game play.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIGS. 3C-1 and 3C-2 illustrate the different ways the behavior metric details are rendered for the selected game.

DETAILED DESCRIPTION

Figure 1:
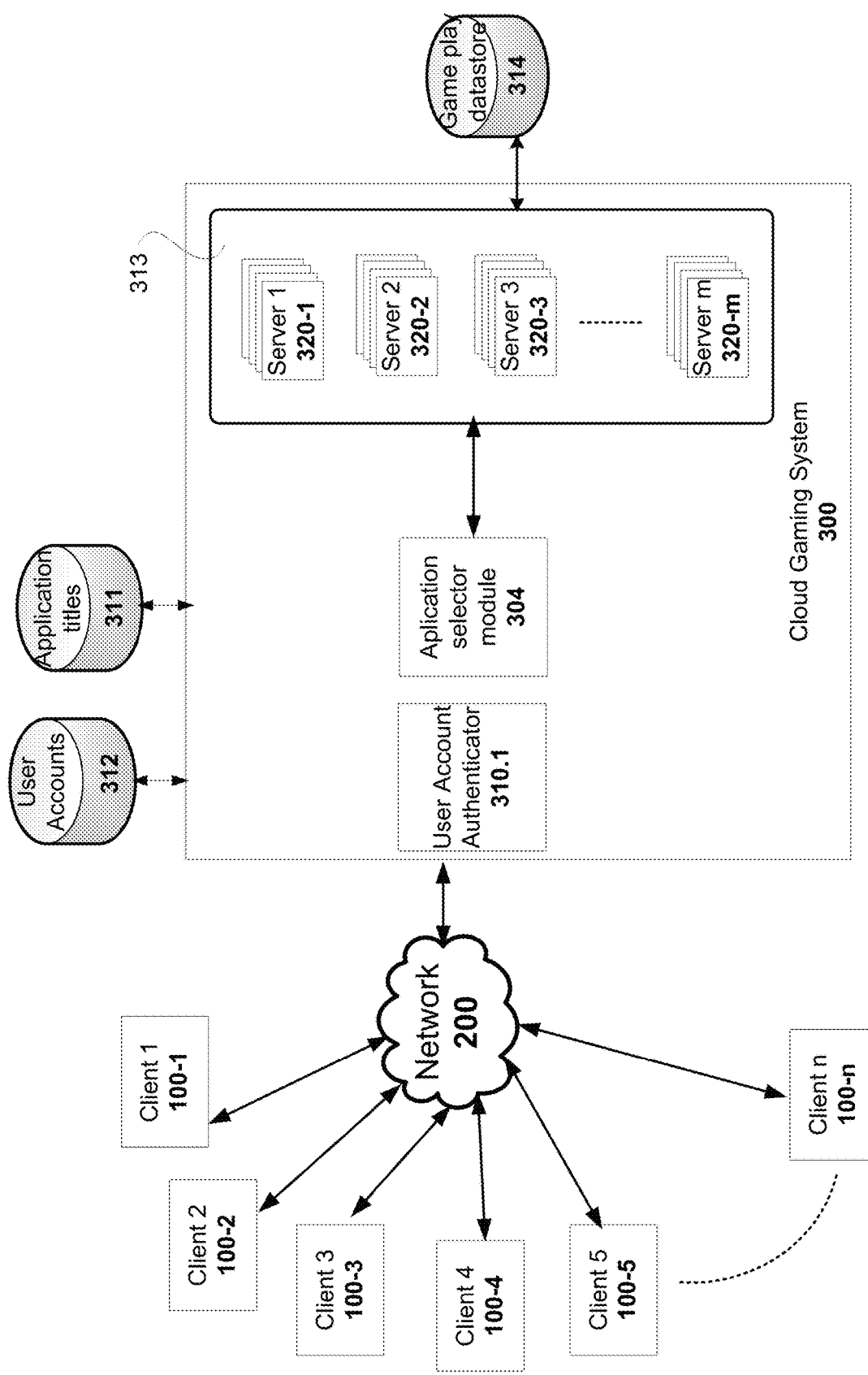
FIG. 1 illustrates a simplified block diagram of an example system that is used to provide details from a prior game play of a game that is selected for current game play, in accordance with an embodiment of the present invention.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

According to various embodiments of the present invention, a user interface provided on a client device is used to access games available on a cloud game server, for a user account. The cloud gaming server is part of a cloud gaming system, which is configured to host a plurality of applications, including online game applications, using resources available to the cloud gaming system. When a game is selected for game play by a current user, application logic of the selected game executing on a cloud gaming server determines a game state of the game and provides hints and other details to assist the user in improving his/her game play. The details are updated to the user interface and presented either during loading of the game for game play or during game play. The details provided at the user interface may include game state, game play statistics, including game score, number of points earned in a current game session, type and number of game tools won or lost or are available to the current user, level achieved, amount of time taken to achieve each level, amount of time the current user is engaged in each session of game play, number of mini-games generated, number of video clips shared, user chats or messages exchanged, contacts (social or game-related) with whom the games were shared or the chats exchanged, other game play metrics gathered during game play of different portions or levels of the game, etc.

The application logic may also identify game play of other users and present a video clip of those users that successfully completed the game or a portion of the game or achieved a completion metric for at least part of the game, a sequence of events, actions, levels, moves, or combinations thereof, to enable the current user to understand the game moves required to complete the game or the portion of the game or to obtain completion metric specified for the game or the portion of the game. To identify video clip of other users to present at the user interface, the application logic may include or engage machine learning logic to build a model of game play of the game using game play interactions of a plurality of users accumulated in the metadata and apply collaborative filtering to identify the video clips from specific ones of the plurality of users that successfully completed the specific portions of the game or achieved completion metrics specified for the specific portions of the game. The identified video clips are updated to the user interface so as to allow an appropriate video clip to be rendered before current game play or at appropriate times during current game play so as to assist the user of the current game play to understand the interactions required to improve the user's own game play for those specific portions of the game. In some embodiments, successfully completing the game or portions of the game relates to achieving a score that meets a minimum level for progressing in the game, or taking a skill action for part of the game, a level in the game, a move or action in the game, or combinations thereof. In some embodiments, meeting a minimum level relates to some game action defined by a rule or metric that is measurable or comparable. In some cases, the rule or metric can be used to compare against play of other users, actions of other users, or a score achieved by a segment of players or groups of players.

Keeping the user engaged for a long period of time and to repeatedly attract the user to the application is every application (e.g., game application) developer's goal. The various embodiments that are described herein allow such possibility by providing sufficient details of game play to the user to assist the user to successfully navigate within the game. In this context, successfully navigating relates to taking actions or sequence of actions in the game that enables advancement in the game or level or movement to other actions or sequences of actions. To be successful, the system is configured to compare actions taken by a user, which can be processed against game mechanics. The game mechanics, if performed to a predefined satisfaction level, can be quantified by a computer process. The quantifying can occur dynamically, wherein actions taken by a user can be processed against data of other users, processes against models produced by machine learning, and the like. In some embodiments, the processing occurs by a server, wherein the server takes or receives inputs from many users that are connected over a network.

The network provides access to a massive amount of user data, which must be processed in substantial real time by one or more cloud processing system. The processing, in turn, must be used to identify details regarding game play, skill achieved by one or more players, and then process quantifiable metrics for specific players. These metrics, in some cases, will dynamically produce results that qualify the behavior of a user/player. The user's behavior, in some embodiments, can then be compared to other users in a dynamic manner. In some embodiments, machine learning can produce a model, and the model can be accessed to identify or predict behavior of the user, either based on the user's previous game play, or based on other users' game play.

The details are provided by analyzing the user's game interactions (both prior game play and/or current game play) and identifying portions of the game the user needs some assistance to navigate. The application logic may use collaborative filtering and machine learning to identify the portions of the game that the user needs assistance in completing and to identify certain ones of other players' game play that have successfully completed those portions or achieved completion metrics. Based on the analysis, the application logic or application mechanics of the game will identify and provide appropriate visual, audio or textual cues and/or video clip(s) to inform or assist the user either before or during a subsequent game play. Providing such assistance alleviates the user's frustration and keeps the users interested in the game.

The user interface available for the user is updated with hints to assist the user during subsequent game play. The game play metrics of the user during a current game play are collected during game play and analyzed after the user leaves an application (e.g., game application) by exiting a user session to determine behavior metrics of the user during game play. Based on the analysis of specific data captured during the user's current use of the application, hints are provided. In some embodiments, in addition to the interaction data captured during current game play, metadata generated during current and prior game play of the game are used for performing real-time analysis of the data to determine game behavior of the user. The game behavior is generated by profiling the user's interactions during current game play, game play history of the user, interactions of other users that played the game (i.e., community data) using machine learning logic and collaborative filtering logic so that appropriate data may be provided to most likely keep the user engaged with the game. Such game behavior are used to dynamically add, remove, rearrange and/or alter the visible and invisible data provided via various options that are available on the user interface. In some embodiments, the dynamic adjustment to the data is performed immediately after exiting the game play of the game. In other embodiments, the dynamic adjustment to the data is performed during game play of the game.

With the general understanding of the invention, specific embodiments will now be described with reference to the various drawings.

FIG. 1 illustrates a simplified block diagram of a system used for providing details related to prior game play of a game by a user, in one embodiment of the invention. Although various embodiments are described herein with reference to game application, it should be understood that the different embodiments may also be extended to other interactive applications. The overall system is a cloud gaming system 300 that can be accessed by a plurality of client devices 100-1 through 100-n that are communicatively connected to a server 320-1, such as an application server, through a network 200, such as the Internet. The cloud gaming system 300 may host a plurality of interactive applications, with each application capable of being instantiated on one or more servers. The servers may be part of one data center 313 or may be spread among data centers that are distributed geographically. Although the various embodiments are discussed in great detail with reference to cloud gaming system, it should be noted that the embodiments can be extended to other systems that include servers or computers that are disposed within a local network that may be accessed directly through wired or wireless connection, or through network 200.

The client device 100 (i.e., any one of 100-1 through 100-n) is any computing device that includes a processor, a memory, network connections to connect to the network 200, appropriate APIs to communicate with a server-side application, and one or more decoders to decode content provided by the server-side application, such as a game application. The processor is capable of executing a client-side application that may interact with a server-side application by connecting to the network 200 through the network connections and use application programming interfaces (APIs) to communicate with or access the server-side application. The network connection can be a wired or wireless connection. The client device 100 may be a thin client, a general purpose computer, a special purpose computer, a game console, a personal computer, a lap top computer, a tablet computing device, a mobile computing device, a portable gaming device, a cellular phone, a smartphone, a head mounted display, a smart wearable device, a set-top box, a streaming media interface/device, a smart television or networked display, or any other computing device that can be used to access an interactive application available on a remote server. The network connections and communication protocol available at the client device 100 enable the client device 100 to communicate with the remote server to receive content, including streaming video frames of multimedia content, from the remote server, such as a server 320 that is part of the cloud gaming system 300. The video frames of the multimedia content have undergone compression using an encoder at the remote server before the video frames are streamed to the client device 100. The client device 100 may include a decoder to decompress the streaming video frames and render content using respective component of the client device 100.

In some embodiments, the amount of processing performed by the client device 100 may vary with respect to input and output processing. Broadly speaking, a game or an application is substantially maintained and executed on a game server or other application server 320 using resources available within a data center 313 and the frames of content generated by the game or the application are compressed/encoded and transmitted to the client device and the client device 100 primarily functions to receive, decode, process and render audio/video data on a display of the client device 100. User interactions provided at the client device 100 is communicated back to the game server or other application server. The client device 100 may be connected to a display for rendering video data. In other embodiments, the display can be integrated into the client device 100. In one embodiment, the display is a networked display device providing a platform operating system for applications or "apps" utilizing the network connectivity of the display device. In such an embodiment, the client device 100 can be defined by an application executed on the platform provided by the display device's operating system.

A server, as used in this application, may be a remote server, a virtual computer, a cloud gaming server, a cloud application server, a remote application server, a digital media server, a server that is used to provide a storefront of a game developer/game sponsor, a webserver, a terminal server, a console server, or any other type or form of server computing device available in a data center that is capable of hosting one or more games or applications (including providing or allocating processing resources for executing the games or applications) that users can access and interact during cloud gaming. The server may include an encoder to compress the data in the video frames and forward the compressed video frames in a data stream to the client device 100 using application programming interface (API) calls that follow specific type of communication protocol.

For example, a server 320, such as a cloud gaming server in a data center 313, services a request received from a client device 100 for access to applications available for a user account associated with the client device 100. The cloud gaming server 320 authenticates the user account by interacting with a user account authenticator module 310.1 to ensure that the request is coming from a valid client device 100. The user account authenticator module 310.1, in turn, interacts with a user accounts database 312 to retrieve account information for the user account and authenticates the request. Upon successful authentication, the cloud gaming server 320 interacts with an application selector module 304 to identify the different applications that are available for the user account. The applications that are available are interactive applications and include applications that were purchased, applications that were shared by other users, and applications that are free and/or available to all user accounts. For example, the interactive applications may include streaming multimedia content applications, such as TV and Video services provided by different media content providers and users, music service, game applications, photo applications, library service, etc. The aforementioned interactive applications are mere examples and other types of interactive applications that provide multimedia content may also be included.

The available applications are provided in a user interface that is forwarded to the client device 100 for rendering. User selection of an application, such as a game application, is forwarded to the server 320. However, as mentioned earlier, the embodiments are not limiting the scope to games and that any type of application may use some or all of the features described herein. The server 320 interacts with the application selector module 304 to obtain the different games that are available for the user account. The application selector module 304 queries an application titles datastore 311 to obtain a list of games that are available for the user account and provides the list of games for rendering on the user interface. Selection of a game from the user interface at the client device 100 is communicated to the server 320. In response to the selection of the video game, the server 320 executes the video game and provides streaming content for presenting on the user interface at the client device 100. User interactions related to the game at the client device 100 are used to drive an outcome of the game.

Figure 2A:
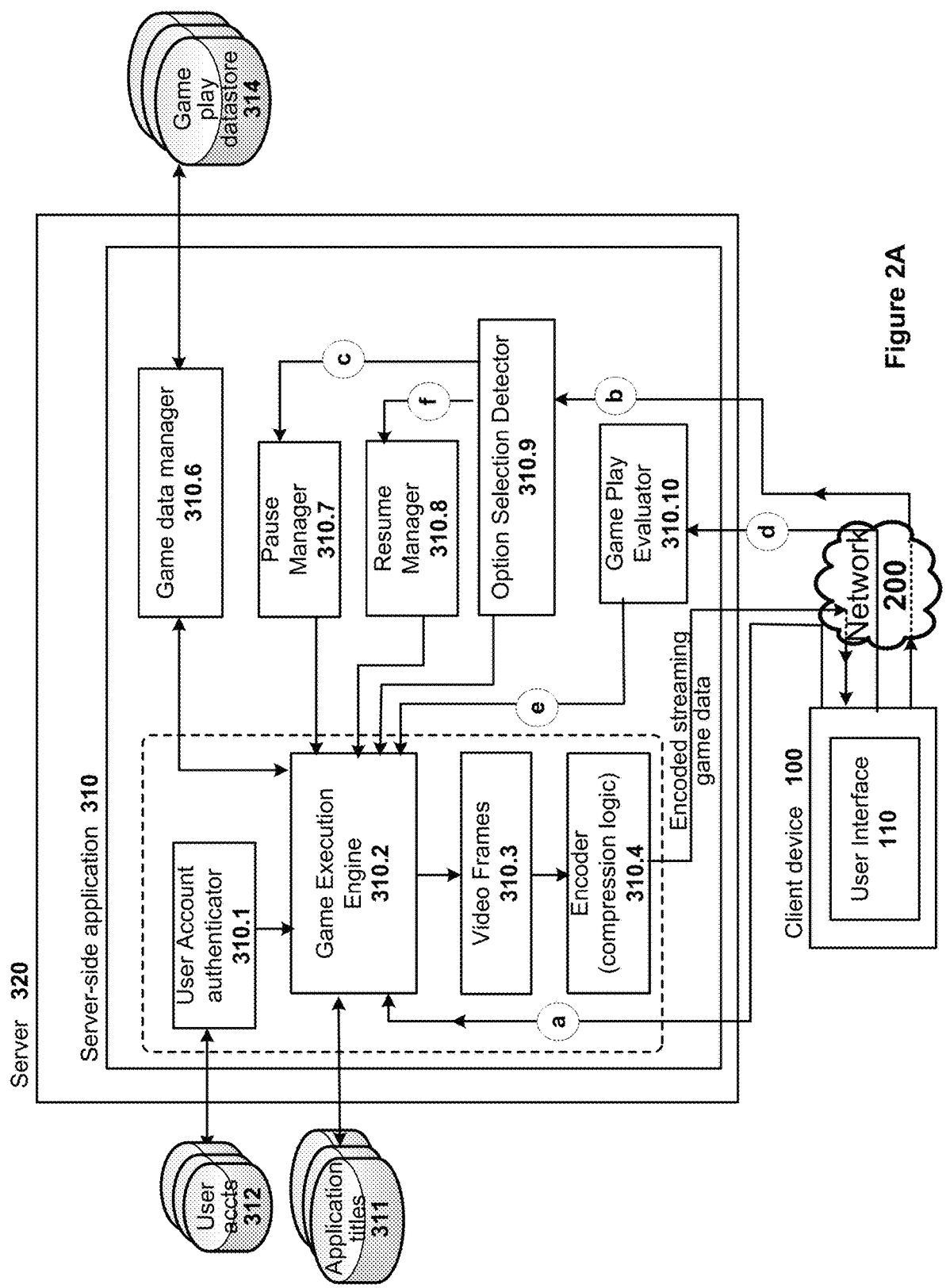
FIG. 2A illustrates an example server-side application with various modules that are used for providing game state, hints and/or other details related to prior game play of a game, in accordance to an embodiment of the present invention.

FIG. 2A illustrates an example server-side application 310 that is used to update a user interface (UI) and/or user experience design (UX) provided to a user that provides hints and other details to assist the user to improve the user's game play, in one embodiment. The server-side application 310 is executed by a cloud gaming server 320 that is part of a data center 313, and includes an execution engine, such as a game execution engine, and a plurality of modules (logical modules) that interact with each other to interpret the user interactions provided at the client device 100 during game play of a game (for example), identify the appropriate user interactions provided during various stages of game play (prior and/or current game play) of a current user or other users for the game captured in the metadata, and present the relevant details for the user to assist the user during current or subsequent game play. Toward this end, the server-side application 310 includes a game execution engine 310.2, a game data manager 310.6, a pause manager 310.7, a resume manager 310.8, an option selection detector 310.9 and a game play evaluator 310.10. In addition to the aforementioned modules, the game execution engine 310.2 may interact with a user account authenticator 310.1, a video frames module 310.3 and an encoder module 310.4.

The cloud gaming server (also referred to as a "server") 320 is part of a data center 313. The data center 313, in one embodiment, includes a plurality of such servers 320 (e.g., gaming servers), storage systems that are capable of storing game codes, application codes, user-related and application-related data stores and make them readily available to enable handling of varied requests from a plurality of users. The data center 313 may also include telecommunication equipment, such as routers, switches, etc., to establish communication connection between the client devices 100 and the plurality of servers 320. Each of the plurality of servers 320 may be equipped with server-side APIs (either distinct or similar) to communicate with the corresponding client-side API at a client device 100 and/or with server-side APIs associated with third party content providers, social media providers, etc. In some embodiments, the servers 320 in the data center 313 may be configured to execute various types of applications (e.g., gaming applications or interactive applications), and stream the application content (e.g., video frames generated by the gaming applications) to corresponding client devices 100 for rendering.

The servers 320 may be configured to receive frames of data generated or provided by the game execution engine 310.2 and formatted by the video frames module 310.3, perform operations of compression on the data using any number of compression techniques defined in the encoder 310.4 and forward the compressed data to the client devices 100 using any one of the communication and/or transmission protocols. The servers may include terminal servers, console servers, virtual servers, etc., that are typically used to perform or execute specific functions, games or applications. Some examples of functions, games or applications performed by the servers may include database management, file management, mail service, print service, web service, game management, application management, media management, catalog service, library service, music service, communications management, computing service, and proxy management, to name a few. In some embodiments, the servers 320, such as console servers, may emulate a game console by executing a game and providing streaming video frames to the one or more client devices 100 for rendering. In some embodiments, a plurality of servers and/or storage devices may be provided as rack-mounted servers or storage devices, with each data center containing rows of server and/or storage racks. Each server may be capable of executing a plurality of applications and/or provide a wide range of services.

It should be appreciated that the gaming application executing on the cloud gaming system 300 facilitates single-user or multi-user cloud-based gaming from users who are co-located or located in different geo locations. In the case of multi-user cloud-based gaming among users that are remotely located, the cloud gaming system 300 facilitates the game play of such gaming application by allowing instances of a video game to be executed by two or more servers 320 (e.g., application or game servers) within one or more data centers, which can be accessed by the users over the network 200. Game states from a single instance (in case of a single-user gaming) or the different instances (in case of multi-user gaming) are exchanged between the servers to enable such multi-user gaming. In this manner, execution of the video game is not dependent on any single user's hardware or network conductivity, though such will affect the game playing experience for that given user.

The operations performed using cloud gaming architecture described herein form technical operations requiring multiple servers and/or execution platforms to enable quick access to databases and presentation of content, such as game play content, to remotely located client devices 100 of users. Cloud gaming can also include the operations of compression performed by the cloud gaming servers utilizing any number of compression techniques. The compression techniques may use standard encoders, which would then allow the standard decoders on client devices 100 to access and decode the data. In some embodiments, specialized encoders and decoders may also be implemented in the servers and client devices, respectively, to allow specialized encoding and decoding. The decoded data may be further processed in the client device to identify image, video and audio data, which are then presented using appropriate device components on the client devices 100, so as to enable game play of the video games.

The management of the video games and distribution can include a number of data centers, direction servers, quality-of-service testers or engines, direction and redirection to lower latency data centers. It should be understood that the management of the video game and distribution of game-related data involve servers from any number of data centers, including special purpose server computers that are designed for streaming and low latency due to the remote execution of games, and the delivery of streaming game or application data to the client devices 100.

When a request to access the cloud gaming system 300 is received from a client device 100, a server-side application 310 executing on a server 320 of an application hosting system (e.g., cloud gaming system 300) interacts with user account authenticator module 310.1 to obtain user-related information. The user account authenticator module 310.1 queries and receives user account information from a user account database 312, where user profile and other user account information of a plurality of users are maintained. The user profile and user account information are used to identify a user associated with the request from the client device 100, and to authenticate the user's request. Upon user authentication, the request is serviced by the server-side application 310. In one embodiment, the server-side application 310 may determine all the applications that are available for the user account, including applications that were purchased, applications that a user is authorized to view or interact, all the applications that are available for free, etc. The applications available for the user account are identified and returned in a list for presenting on a user interface at a display of the client device 100. In one embodiment, user selection of any one of the applications on the list is detected by the server-side application 310, and in response, the various options under the selected application is identified and transmitted for presentation on the user interface. The various applications and the various options that are available under each application will be discussed in more detail with reference to FIGS. 3A-3C.

For example, if the game application is selected from the user interface, the server 320, in response to the selection, may identify a list of game titles that are available for the user account and transmit the list for presenting on the user interface at the client device 100. In one embodiment, an application selector module 304, which may be part of the server-side application 310 may interact with application titles datastore 311 to identify the various game titles available for the user account. The list of game titles are forwarded to a client device for rendering on a user interface. Additionally, the server-side application may query the game play datastore 314 to determine if any behavior metrics are available for each of the game titles identified for the user account. If there are behavior metrics available for any of the game titles, such information are also included with the game title provided to the client device. Behavior metrics may be available for game titles if the user of the user account or other users played the respective ones of the game titles previously. The behavior metrics, in one embodiment, provide tips for a game, such as game hints, video clips of game play, etc., that are customized for a user, based on game play interactions provided by the user or other users during prior game play. In an alternate embodiment, the behavior metrics may be available for game titles that are hosted by the cloud gaming system even when the game titles do not have any registered game play. In this embodiment, the game hints for a game may include expected user inputs specified in the game logic of a game.

In one embodiment, user selection of any one of the game titles rendered on the client device 100, is detected based on a signal sent from the client device 100 to the server 320 of the cloud gaming system 300 informing the server of the selection of a game title. In response to receiving the user selection of the game title, the server 320 of the cloud gaming system 300 may execute an instance of the selected game title. Game related data is generated by the game execution engine 310.2 using the game logic defined for the selected game. The game related data are formatted by a video frames module 310.3 and compressed by an encoder 310.4 using any standard or special compression technique. The encoded game data are then streamed to the client device 100 over the network 200 following communication protocols specified by the server-side application 310.

In some embodiments, the encoder 310.4 may be part of the server-side application 310. An Application Programming Interface (API) of the server-side application is used to stream the encoded video frames to the primary client device 100. In some embodiments, the APIs that are part of the server-side application 310 may include encoding logic to encode the video frames and forward the encoded video frames to the client device. In alternate embodiments, the video frames generated at the game execution engine 310.2 are captured by an operating system of the server 320 and processed. In some instances, the operating system may encode the video frames, monitor the network conditions and adjust quality of the video frames before the encoded video frames are streamed to the client device 100. Alternately, the operating system may process the video frames and forward the same as HDMI video signals. An external application that is outside of the cloud gaming system or outside of the server 320 may capture the HDMI video signals, encode the video frames captured in the HDMI video signals using an external encoder, monitor the network conditions and adjust the resolution of the images in the video frames and/or transmission rate prior to transmitting the video frames to the client device 100 through one or more APIs available within the external application. It should be noted that the process used for capturing, monitoring network conditions, encoding and transmitting the video frames may be extended to audio data, as well. User interaction at the client device 100 is received by the server 320 and used to adjust game outcome at the game execution engine 310.2.

The user may interact with the game and such user interactions are transmitted back to the server-side application 310. In one embodiment, a game play evaluator 310.10 receives the interactions (represented by bubble 'd') generated during game play and processes the interactions to determine the interaction type provided at the client device. The processed interactions are forwarded to the game execution engine 310.2 to affect an outcome of the game. The game execution engine 310.2 may interact with game data manager to determine and update game state, game play statistics and other game-related, user-related information, based on the interactions provided during game play of the game. The updated interactions are then stored in the game play datastore 113 and/or user account datastore 312. For example, the game-related data, such as the game level, game state, game play statistics, social communications during game play, etc., for the user account may be updated to the game play datastore 113. Similarly, user-related data, such as user's skill level, ranking, popularity, etc., may be updated to the user accounts datastore 312. The game execution engine 310.2 may generate game updates for the game, based on the user interactions, and such updates are formatted, compressed and streamed over the network 200 to the client device 100 for rendering.

As the game play progresses, the user may elect to complete the game or may quit the game in the middle of game play out of frustration of not making much progress in the game. When the user quits a game session, a game pause signal may be sent by the client device 100 directly to the game execution engine 310.2, as illustrated by directional arrow represented by bubble 'a'. In an alternate embodiment, the pause signal may be transmitted to the option selection detector 310.9, as illustrated by directional arrow represented by bubble 'b'. The option selection detector 310.9 may interpret the pause signal and instruct or send a command or signal to a pause manager 310.7 to pause the game play of the game, as illustrated by direction arrow represented by bubble 'c'. The pause manager 310.7, in response to receiving the pause command, may signal the game execution engine 310.2 to pause the game play. In another embodiment, the user selection of the pause option may be forwarded to the game play evaluator 310.10, as illustrated by directional arrow represented by bubble 'd'. The pause command or signal may include the game identifier and/or the client device identifier. The game play evaluator 310.10 may, in response to receiving user selection of the option, send a signal or command to the game execution engine 310.2 to pause the game play of the game, as illustrated by directional arrow represented by bubble 'e'.

Irrespective of which module is being used to provide the pause signal, the game execution engine 310.2, in response to the pause signal, will interact with a game data manager 310.6 to identify a game state of the game at a time the pause signal was received at the server 320. The game execution engine 310.2 is configured to analyze game state at the time the pause signal was received, and to identify a restart point from where the game play may be resumed. The game state of the game and the restart point may be provided to the game data manager 310.6 so as to update the game play datastore 313 for the user account. The game data updated by the game data manager 310.6 includes progression made in the game during game play up till the point when the pause request was received. This game data may be used to re-create the game play of the game when the game play is restarted during a subsequent game play session. Further, as part of pausing the game play, the game execution engine 310.2 suspends streaming video frames of the game to the client device.

The game may be a single-user game or a multi-user game. In the case where the game is a multi-user game, the user may have played the game with one or more other users during a game play session. In such cases, when one user pauses and exits the game play session, the game play of each of the other users may be paused and the game state of each user is stored within the game data in the game play datastore 314. The game play may be resumed by any of the users that were playing the multi-user game by selecting a resume option at the user interface of the corresponding client device.

In an alternate embodiment, when one user of the multi-user game exits the game play session, the game play of the other users may continue. In such embodiment, the game play of each of the multi-user game is saved at the game play datastore 314. Game play of each of the other users that continued the game play is used in identifying behavior metrics for the game associated with the user account. The behavior metrics are used to provide hints and other details at the user interface for a subsequent game play session of the game for the user account.

In one embodiment, the user may select the game for game play, wherein the user selection is for starting the game from the beginning. The game may have been previously paused. However, the user selection for starting the game play of the game from the beginning would cause the game execution engine to execute an instance of the game on the server and making the game available for game play.

In an alternate embodiment, the user may elect to restart the game that was previously paused during a prior game play session. The restart request may be initiated by the user's selection of a resume option provided in the user interface. The user's selection of the resume option is transmitted from the client device to the option selection detector 310.9 on the server 320. The option selection detector 310.9 processes the user's selection by verifying that the request is a valid option and once verified, forwarding the resume option signal to the resume manager 310.8. The resume manager 310.8 processes the request by interacting with the game execution engine 310.2 to verify that the resume request is for the game that was paused by the user during prior game play session, and to determine game state of the game.

The game execution engine 310.2 may query the game data manager 310.6 to obtain the game state of the game, a restart point in the game from where to resume the game play, game play statistics from the user's prior game play, and other data for providing the game details for the user. The resume manager 310.8 may then instruct the game execution engine 310.2 to recreate the game play of the game up till the restart point and to resume the game play of the game from the restart point. In one embodiment, the restart point may identify a point in the game that is a few video frames before where the game play was paused.

The game execution engine may use the data obtained from the game data manager 310.6 to re-create the game up till the restart point, including in-game wins, losses, game levels overcome, game options left, in-game chats, messages, etc., out-of-game social communications generated during prior game play, game status, etc., so as to present the status of the game up till the point where the user left off. In one embodiment, during the re-creation (i.e., loading) of the game or during current game play, the game execution engine 310.2 may provide the user with options to view the behavior metrics generated for specific portions of the game for the user.

Once the game is loaded and the game play is resumed, video frames generated from the resumed game play are compressed in accordance to a communication protocol defined for the client device 100, using the encoder logic 310.4 and streamed to the client device over the network 200. User interactions at the current game play are received and processed by the game play evaluator 310.10, option selection detector 310.9 and appropriate signals are sent to the game execution engine 310.2 to update the current game state of the game.

The game execution engine 310.2 analyzes the game data for the game, including user's interactions provided during current game play, to determine the user's current game behavior, historical game behavior determined from prior game plays for the game or for other games, and provides appropriate behavior metrics for the user based on the current game state of the game. As part of the analysis, the game execution engine 310.2 may analyze the game behavior of other users that played the game, identify appropriate behavior metrics of select ones of the other users and include the behavior metrics of the other users for presenting in the user interface for the user. The current game state identifies the portion of the game the user is currently playing. User interactions in the game are used to update the game state of the game.

Change to the game state causes a dynamic update to the behavior metrics provided in the user interface. As the user progresses in the game and continues to interact with different portions of the game, the game state is dynamically being updated. Change in the game state would cause a dynamic update of the behavior metrics presented at the user interface so that appropriate hints and other details that are relevant for the portion of the game the user is currently interacting with is provided in the user interface. The hints are provided on the user interface to assist the user to improve the user's game play of the portion of the game. These hints are personalized and tailored to the user based on the portion and are based on the user's game behavior in the portion of the game. For example, the game execution engine would analyze the user's current game interactions and the historic interactions provided during the prior game plays of the game, using machine learning logic, to determine the user's game behavior captured during game play of the portion of the game. Based on the analysis, the game execution engine 310.2 may determine that the user is having difficulty in overcoming a particular challenge encountered in the portion of the game. The game execution engine may then employ collaborative filtering to identify particular ones of other player's game play from which to generate the behavior metrics for the user.

The behavior metrics include game hints and other details to assist the user in the game play of the game. The hints may be provided in textual format, audio format, visual format, video format, graphical user interface format, etc., and may, in some instances, include game moves to make, sequence of buttons to press, etc. The video format of the hints may also include a video clip of another user's game play. The user interface is updated with options to access the behavior metrics.

In one embodiment, during loading of the game for restarting game play, user interaction at any of the options is detected and a signal is sent from the client device 100 to the option selection detector 310.9 for processing. The option selection detector 310.9 will validate the option selected by the user and send appropriate signal or command to the game execution engine to process the selected option. The game execution engine may identify the option selected and identify the appropriate behavior metrics data available for the game for the user. In order to identify the appropriate behavior metrics, the game execution engine may determine current game state of the game, which identifies the portion of the game the user is currently navigating during game play, determine the game behavior of the user (both current and historical game behavior), and identify the behavior metrics that are appropriate for the portion of the game based on the game behavior. The identified behavior metrics are updated at the user interface of the client device 100.

In another embodiment, the game execution engine may automatically present select ones of the behavior metrics details related to prior game play at the user interface while the game is being loaded for current game play. For example, the game execution engine 310.2 may provide game statistics of the prior game play of the user while the game is being loaded for current game play. In another example, the current game state of the game may be provided in the user interface. Included with the game state may be an image or video clip of a last video frame from the prior game play. The image or video clip may be provided to visually show the user where the user left off and the type of interactions provided by the user for the portion of the game, so as to get the user prepared for the current game play.

The game logic within the game execution engine may engage machine learning logic to evaluate the prior game play of the user to determine the user's game behavior. Based on the evaluation, it may be determined that the user has been repeatedly attempting to overcome a challenge within a particular portion of the game and has been unsuccessful or has not achieved a completion metric specified for the particular portion every time. Based on such machine learning, the game execution engine may identify hints for the current game play. The hints may be provided from the game inputs specified in the game logic of the game to help the user to improve his/her game play of the particular portion of the game. In one embodiment, the game execution engine may use the information obtained about the prior game play from the machine learning logic and use collaborative filtering to identify game plays of one or more other users that played the game and successfully completed or achieved completion metric or sequence of events, actions, levels, moves or combinations thereof, for the portion of the game that the current user is unsuccessfully attempting. The game execution engine 310.2 may then select game play of a particular one of the other users and extract a video clip for the portion of the game and present the extracted video clip to the user to visually show the user how the other user/player was able to successfully provide completion metrics for the portion of the game. In one embodiment, the particular one of the other users is selected based on skill level of the user. In an alternate embodiment, the particular one of the other users is selected based on similarity in the user interactions provided for the portion of the game. For example, if the user has completed some challenges in the portion using certain game moves and is having a hard time to complete other challenges, the particular one of the other users is selected based on the similarity of the game moves provided by the other user in overcoming the same challenges the user completed. This matching of the game moves would allow the user to continue at his skill level and not having to learn new moves, while having the ability to complete the other challenges by using game moves provided by the particular one of the other users. In another embodiment, the particular one of the other users is selected by matching at least a portion of a user profile of the user with corresponding portion of the user profile of other users.

In one embodiment, the game execution engine 310.2 may provide the video clip of the select one of the other user's game play while the game is loading for resuming game play. In an alternate embodiment, the game execution engine may provide the textual hints for rendering at the client device 100 during the loading of the game at the server 320 for current game play and video clip from the select one of the other users when the user is playing the portion of the game during current game play so that the user is able to view and mimic the other user's game moves or button presses or game inputs. In one embodiment, as the user progresses in the game and approaches a particular portion of the game where behavior metrics are available, the game execution engine may perform real-time analysis of the user's interactions during current game play to detect the user's approach toward the particular portion and, in response, dynamically update the user interface to provide the behavior metrics available for the user that is specific for the particular portion of the game. Further, the game execution engine may provide signals to provide visual cues (highlights, animated mark-up, etc.) to inform the user that specific ones of the behavior metrics are available for viewing or for reference for the particular portion of the game. As the user completes the particular portion and approaches another portion of the game, the user interface is updated with the behavior metrics that are appropriate for the new portion of the game. User's selection of any of the behavior metrics may cause the relevant details to be provided, wherein such details may be obtained from the prior game play of the user (e.g., game status, game state, game hints, game clip, etc.) or of other users (game hints, video clips, etc.) or from the game logic (e.g., button presses, etc.).

Figure 2B:
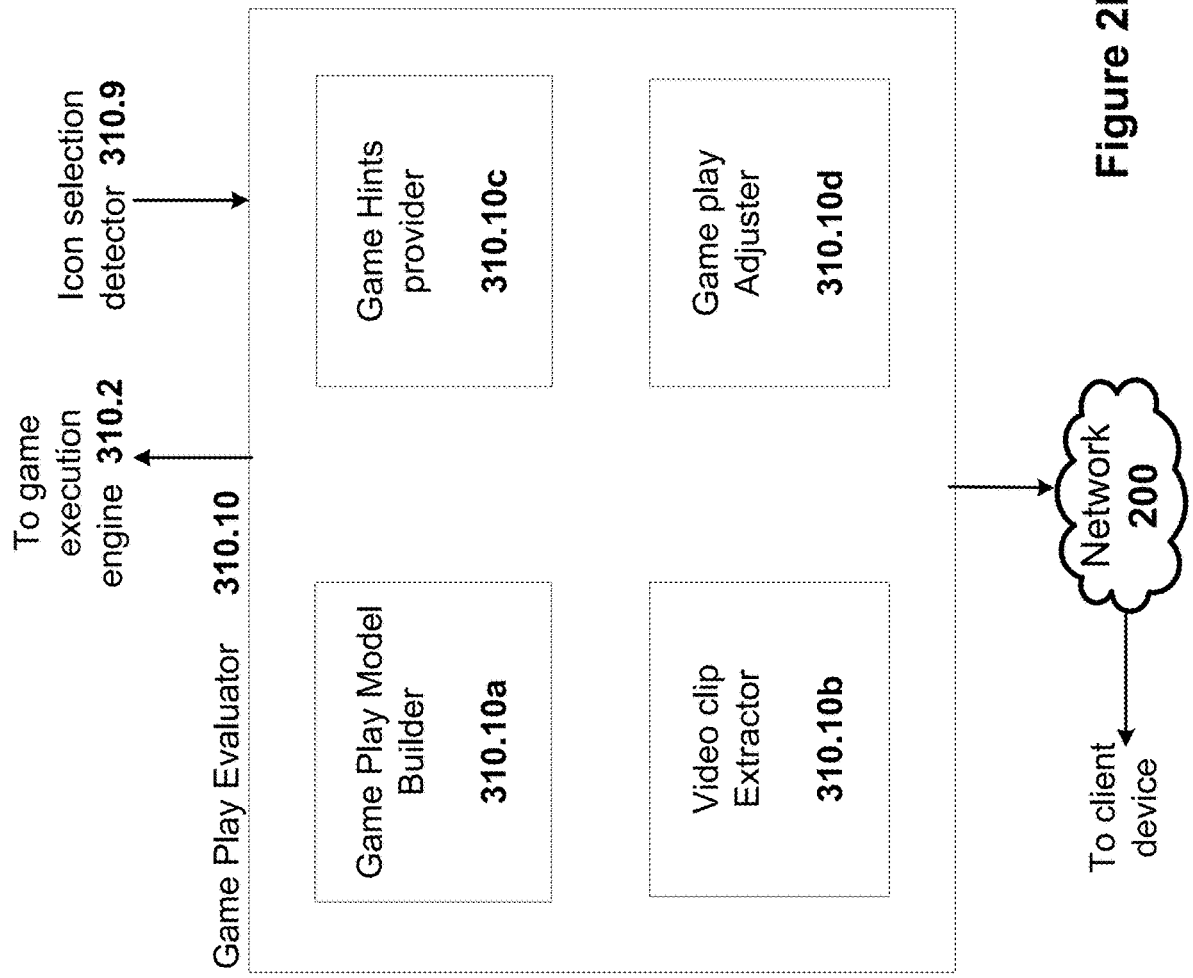
FIG. 2B illustrates a simplified block diagram of an example game play evaluator module available within the server-side application used to provide game state, hints and/or other details of a prior game play of the selected game, in accordance with one embodiment of the present invention.

FIG. 2B illustrates the various modules within the game play evaluator 310.10 that is used to provide the details of the prior game play to the user, during current game play of the game that was paused, in one embodiment. The game play evaluator 310.10 includes a plurality of logical modules that are used to evaluate the interactions provided by the user at the client device 100 and to identify appropriate behavior metrics for presenting to the user. An example set of logical modules included in the game play evaluator 310.10 include a game play model builder 310.10a, a video clip extractor 310.10b, a game hints provider 310.10c and game play adjuster 310.10d. The game play evaluator 310.10 is not restricted to the aforementioned logical modules but can include additional or fewer logical modules.

As mentioned earlier, details of prior game play include game state, video clips of game play, hints to obtain completion metrics for a portion of a game. The details are obtained by building one or more game models and analyzing the data provided in the game model. In one embodiment, the game play evaluator 310.10 may engage a game play model builder 310.10a to build the game model. The game play model builder 310.10a uses machine learning logic to analyze the user's interactions during prior game play to identify the user's game behaviors and to identify one or more portions of the prior game play where the user was having trouble to complete the challenge. In one embodiment, the machine learning is supervised machine learning. In the supervised machine learning, the machine learning logic in association with game logic determines the inputs that need to be provided for a portion of the game to achieve certain desired results. In an alternate embodiment, the machine learning may be unsupervised machine learning, wherein a function is inferred to describe a hidden structure in the data.

The machine learning logic then analyzes the interactions provided by the user for the portion to determine if the game inputs provided by the user are comparable to what is expected by the game logic (i.e., completion metrics) and if not comparable, what changes need to be made to achieve those results. The game play evaluator 310.10 may then engage collaborative filtering along with machine learning to identify the different users that have successfully achieved the results or completion metric or provided a sequence of events, actions, moves or combinations thereof that are expected for the portion of the game and to extract a video clip for the portion of the game from the select one of the game plays of the different users for presenting to the user of the current game play. In collaborative filtering, the game play evaluator 310.10 uses the analysis from the machine learning logic to determine which of the other users that played the game provided the interactions to successfully complete the portion of the game.

The game play model builder 310.10a builds one or more game play models for the game using the game inputs that are specified by the game logic, game behavior of the user (which includes user interactions provided by the user during current game play and prior game play(s) of the game), and user interactions of a plurality of other users that played the game. In one embodiment, the game play model may be built using game behavior of the user and of the other users from prior game play. The model is then updated with the interactions from the user's current game play. The game play model builder 310.10a then analyzes the model(s) to determine what the inputs for the game is for each step or level or portion of the game, look at inputs provided by the user, other users, to determine the deviance of the interactions provided by the user as compared with the other users. Using the results from the analysis, the game play evaluator 310.10 may determine which portion(s) of the game a user excelled, which portion(s) of the game the user had trouble, etc. The game play evaluator 310.10 then identifies specific one of the other users who successfully completed or achieved completion metric or provided sequence of events, actions, levels, moves, etc., for the portion of the game that the user is having trouble completing. As mentioned before, the specific other user may be identified based on the skill level of the player, or the similarity in the game inputs provided while navigating the portion of the game or based on user profile. It should be noted that the model(s) built by the game play model builder 310.10a may be used to assist a new user to play the game.

Once the specific other user is identified, a video clip extractor 310.10b may be engaged by the game play evaluator 310.10 to extract a video clip of game play for the portion of the game. The video clip extractor 310.10b may analyze the video recording of game play to identify the video frames of the game play corresponding to the portion of the game and extract the identified video frames. The extracted video frames are bundled using an encoder and provided at the user interface for the portion of the game as one of the behavior metrics so as to be rendered at the user interface to assist the user during game play of the portion of the game.

It should be noted that the video clip extractor 310.10b may generate one or more video clips for different portions of the game. As and when a video clip is generated, the generated video clip is associated with the game icon and the user interface is updated for the corresponding portion of the game for the user so that the user may be able to access it at any time the user accesses the game. Since the game behavior of each user may not exactly be the same, the behavior metrics may be different for different users as the behavior metrics are generated based on the game behavior. As a result, the behavior metrics are specifically customized for the user and for the specific portion of the game. The behavior metrics provided for the user may be accessed during the loading or during game play of the game to assist the user to navigate through any portion of the game with considerable ease and familiarity, greatly enhancing the new user's game play experience.

The generated video clip for a portion may be rendered upon detecting user interaction at an option provided in the user interface, in one embodiment. In an alternate embodiment, rendering of the video clip on the user interface may be automatically triggered by the game logic of the game in response to detecting the user's difficulty in successfully completing or achieving completion metrics for the portion of the game. The user may be a new user that is playing the game for the first time or can be a repeat user that is restarting the game for game play. The game may have been paused during a prior game play due to the user's failed attempts at the portion of the game or for other reasons. Even if the user is resuming a paused game play and attempting to play the remaining portion of the game for the first time, the video clips and other game hints may be provided to the user as game play recommendations to assist the user to successfully navigate through the respective portions of the game. The extracted video clip is stored in the game play datastore 314 and used for providing cues to other users, as and when needed.

Game hints provider 310.10c is similar in function to video clip extractor 310.10b, in that the game hints provider 310.10c analyzes the model(s) built by the game play model builder 310.10a to determine the game inputs from the game logic or specific one of the other user's game play to use to provide hints to a current user playing the game to provide completion metrics for the portion of the game the user is currently attempting. The game inputs specified by the game logic identify a sequence of moves or button presses or data inputs that need to be provided for the portion of the game. These inputs and other users interactions may be used to provide hints in different formats (textual, audio, video, graphical user interface (GUI), etc.). The video clip and the game hints are tailored for the user, and may be based on the skill level of the user or user's preference. The user interface may be updated to provide visual cue at appropriate times during the rendering of the game play. It should be noted that the number, type and sequence of the different behavior metrics provided at the user interface for a user may vary for a game and for different games. For example, 3 different types of behavior metrics may be identified and associated with portion 1 of game 1, 5 different types of behavior metrics may be identified and associated with portion 2 of game 1, 2 different types of behavior metrics may be identified and associated with portion 3 of game 1, and so on. The number and sequence of the behavior metrics available for each portion of a game and/or for each game may vary based on type of interactions, the user's game behavior detected during game play of the user, and/or type of game that is being played.

The game play adjuster 310.10d also uses the game model(s) built by the game play model builder 310.10a to analyze the game behavior to determine how the current user is fairing during game play. The game play adjuster 310.10d, in one embodiment, may use the machine learning logic to analyze the game behavior of the user during prior game play(s) to determine the user's game playing skills for the game. In an alternate embodiment, the game play adjuster 310.10d may analyze not only the game behavior of the user from prior game play but also the current game play in order to determine the user's game playing skills for the game. If the analysis determines that the user is having a difficult time to accomplish certain challenges, the game play adjuster 310.10d may send a signal to the game execution engine 310.2 to update the user interface with an option to enable the user to customize the game. The customization may include adjusting the speed or level or difficulty of the game. In an alternate embodiment, the game play adjuster 310.10d may send a signal to the game execution engine 310.2 to dynamically adjust the speed or level or difficulty of the game so that the user may be able to play a less challenging version of the game.

Figure 3A:
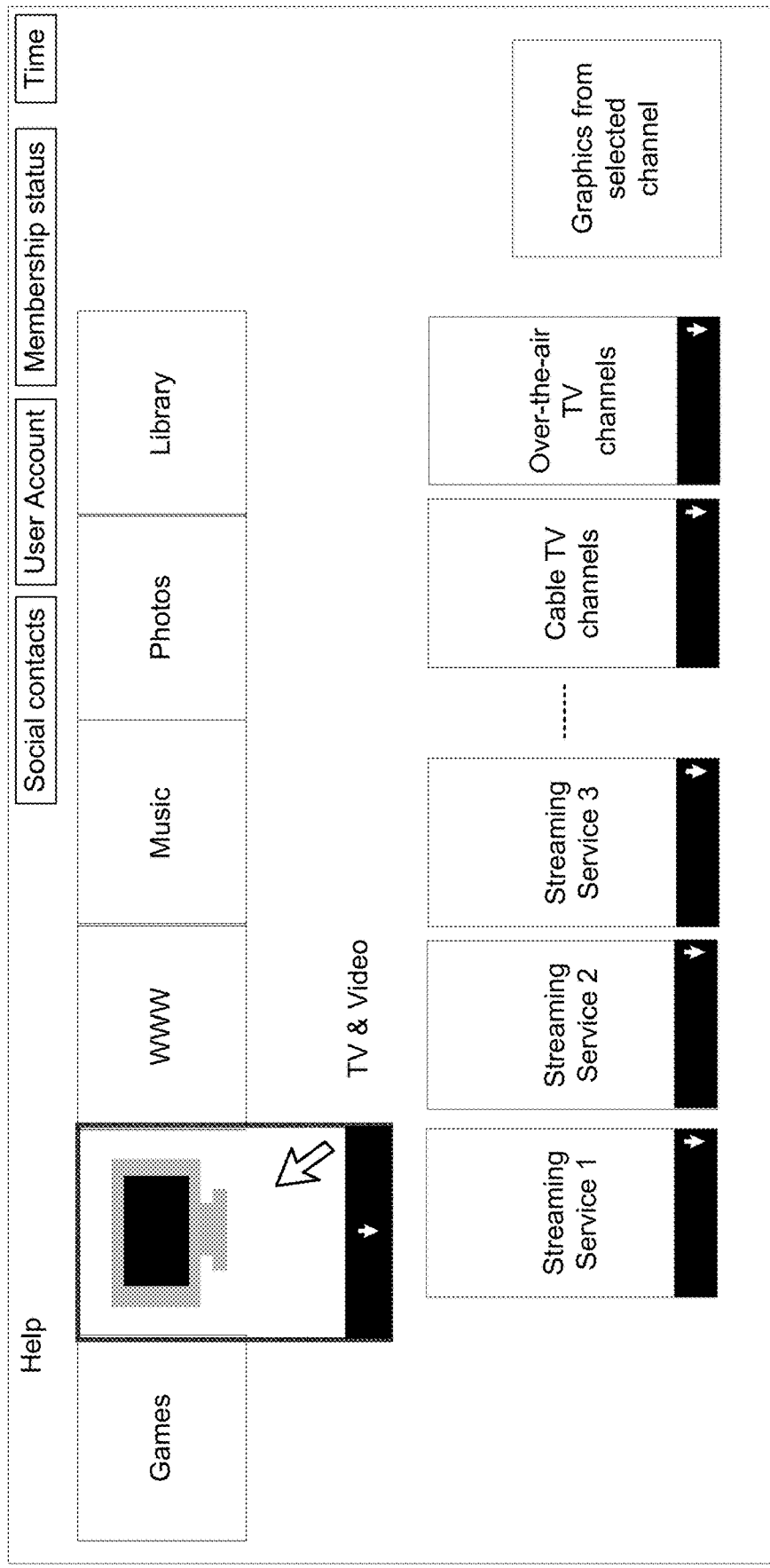
FIG. 3A illustrates a sample user interface with various application options provided by the server-side application for rendering on a client device, in accordance with one embodiment of the present invention.

FIG. 3A illustrates an example user interface provided by the game execution engine 310.2 for rendering at the client device 100. The various applications or services that the user can select from the user interface depend on what is available for the user account of the user. In one embodiment illustrated in FIG. 3A, the applications that are available for the user account include games application, TV and video application, internet application, music application, photos application and library service. Of course, the aforementioned list of applications are provided as an example and that a user account may have access to fewer or additional applications. Each application or service includes a plurality of options. FIG. 3A illustrates one such example wherein selection of TV & Video application causes the various options (Streaming service 1, streaming service 2, streaming service 3, . . . cable TV channels, over-the-air TV channels, etc.) under the TV & Video application to be rendered on the user interface for user selection. Some of these applications may generate streaming content that are encoded and streamed to the client device for rendering.

Figure 3B:
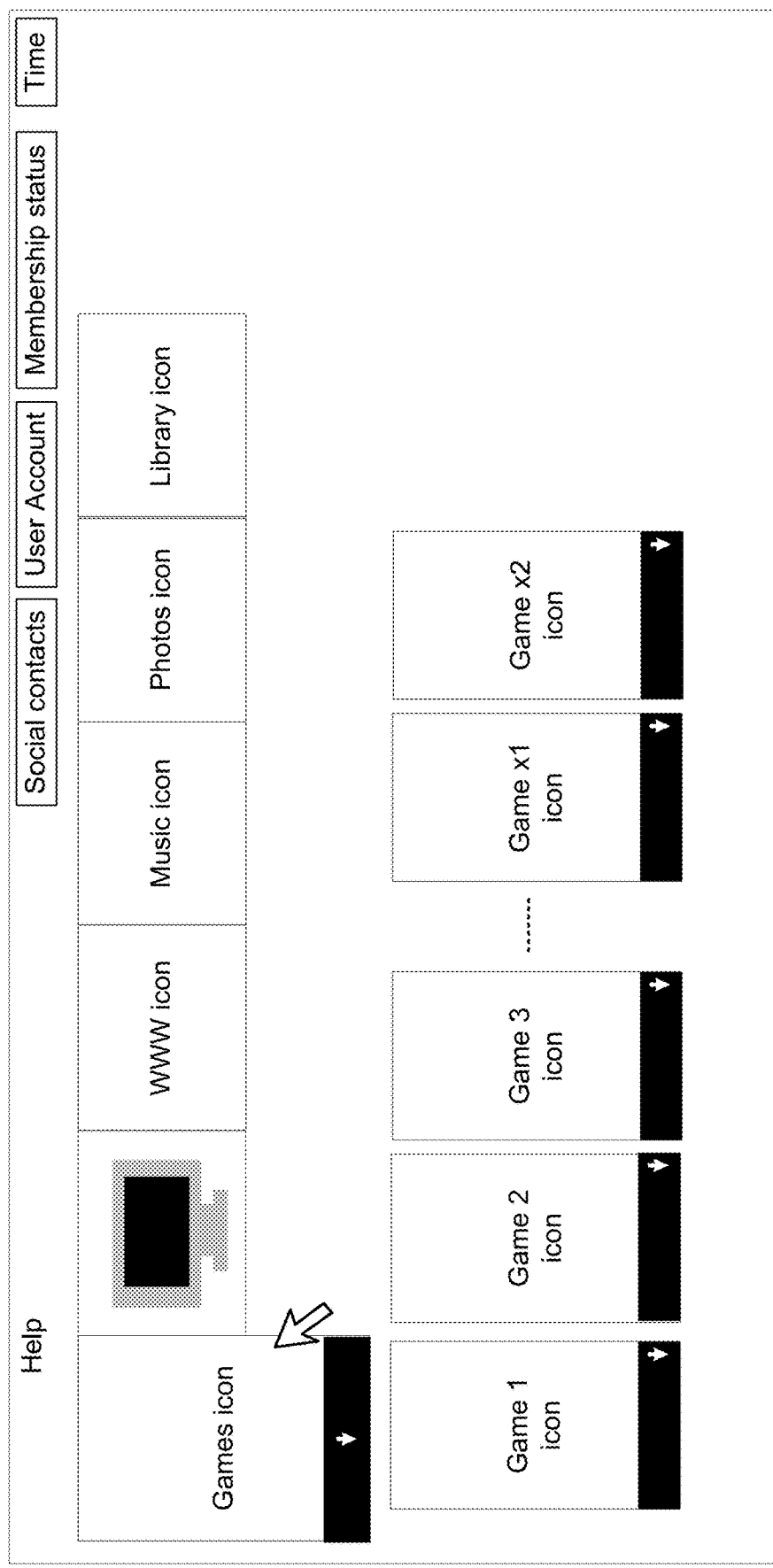
FIG. 3B illustrates a sample user interface rendering options providing multimedia content that are available under each application, in accordance to one embodiment of the invention.

FIG. 3B illustrates another example user interface where a game application has been selected from the applications available for the user account shown in FIG. 3A. The game application includes a plurality of games (game 1 game 2, game 3, . . . game x1, game x2) that are available to the user for viewing and/or interacting. These games generate streaming video frames that are encoded and streamed to the client device for rendering.

Figure 3C:
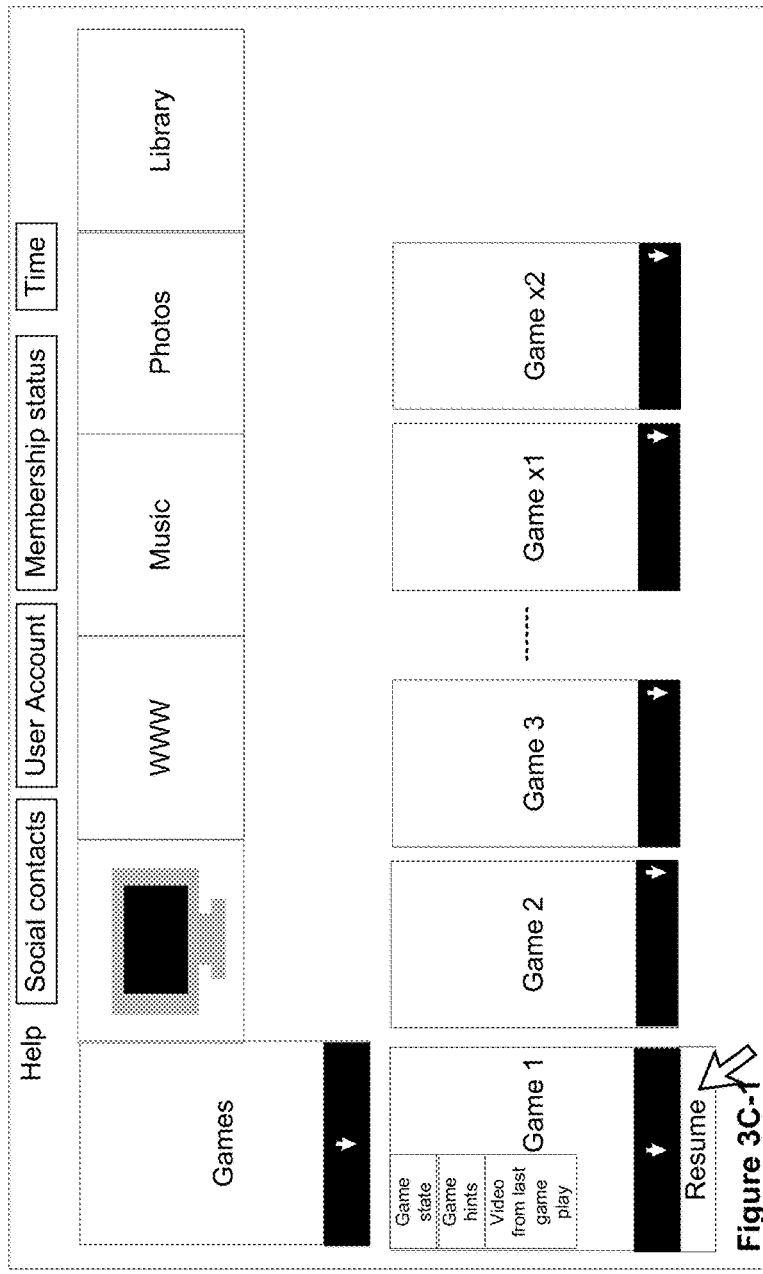
FIG. 3C illustrates a sample user interface rendering behavior metric details that are available for a selected game, in accordance with one embodiment of the invention.
Figure 3C:
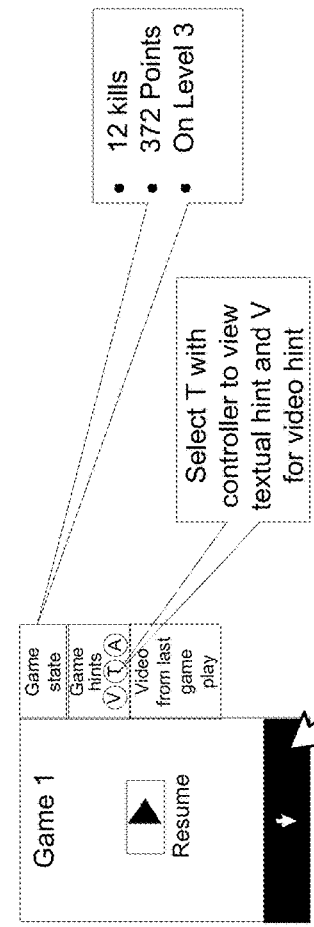

FIG. 3C illustrates another example of user interface wherein when a particular game is selected, behavior metrics that are available for the particular game is rendered at the user interface either alongside the content or in a portion of the display screen that also renders the content (i.e., game scenes) of the selected game. The behavior metrics that are available may vary for each game for each user. FIG. 3C-1 illustrates an updated user interface for game 1 that provides an option to restart game play of game 1. When the user selects the "Resume" option, the behavior metrics for the game is presented inside or alongside the portion where the representative game icon of the game is being rendered. FIG. 3C-2 illustrates the available behavior metrics options for the game that are rendered outside the portion of the display where the game icon and the game scenes are rendered. In the embodiment illustrated in FIG. 3C-2, the "Resume" option of FIG. 3C-1 has been replaced by a "Play" icon option within the portion of the display.

Figure 4A:
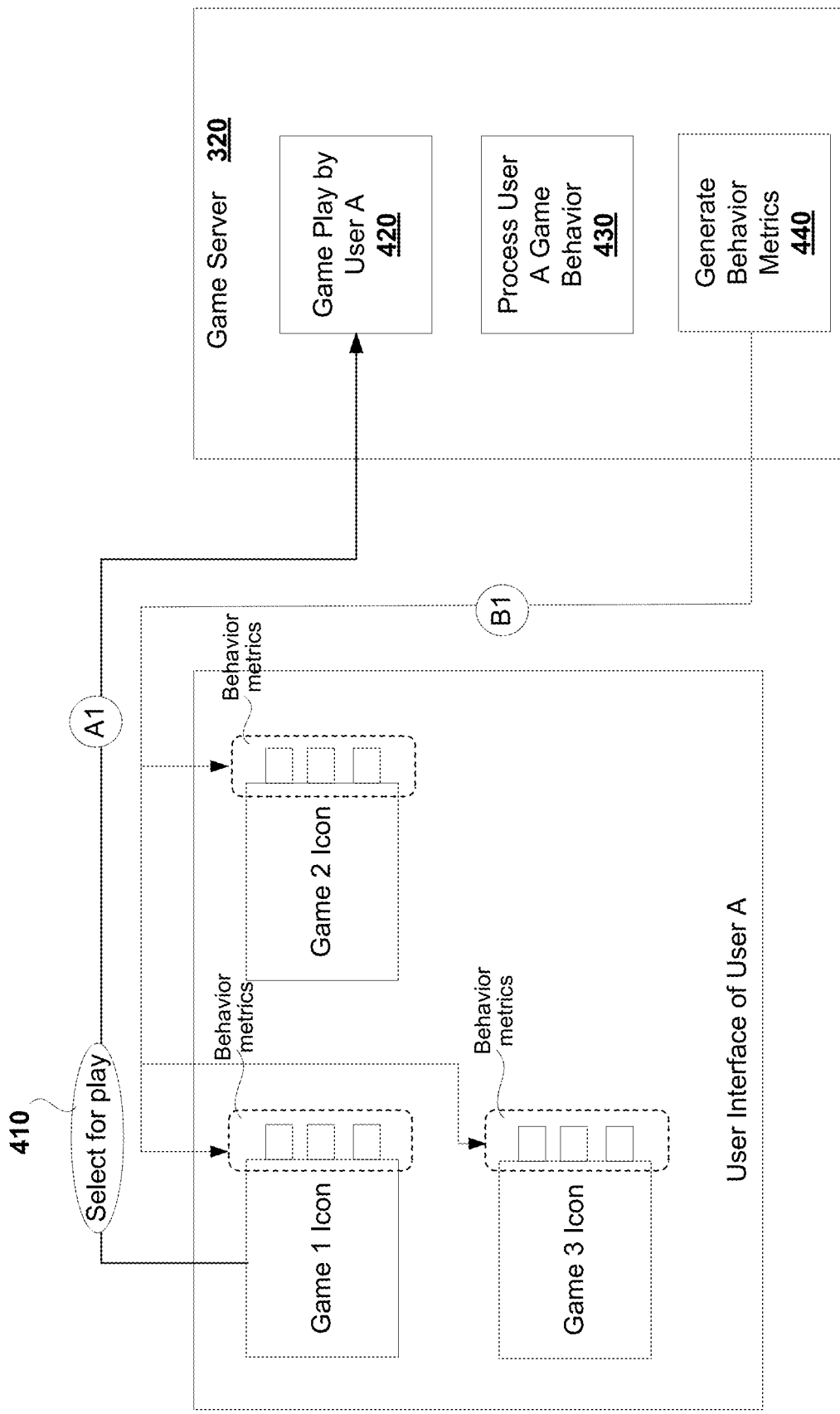
FIG. 4A illustrates a simple block diagram of a data flow process used to present behavior metrics for a user of a game at the user interface to assist the user in improving game play, in accordance with one embodiment of the invention.

FIG. 4A illustrates flow of game data generated during game play, for a particular game selected at the user interface, in one embodiment. The user interface provided at the client device includes a plurality of games that are available for the user account of the user. Each game is represented on the user interface with a representative game icon. Behavior metrics that are available for the game for the user account are also provided alongside the game icon. The behavior metrics may include game hints, game clips selected from one or more users that played the game, game state and other game related data.

As illustrated in FIG. 4A, a user A selects Game 1 (G1) for game play (410). The selection signal is transmitted to a server, such as a game server 320, on which a server-side game application 310 executes, as shown by bubble 'A1'. The execution of the game causes game scenes and game data to be generated at the server for the user A during game play (420). The generated game data is returned to the client device for rendering and for user interactions. User interactions generated by the user A is transmitted to the server 320 to affect the game state of the game G1. During game play of the game or after game play of the game, the game data of user A is processed to determine game behavior of user A (430).

The game execution engine may process the game data to identify game interactions provided by the user and compare it to game inputs defined by the game logic of the game G1 to determine the user's game behavior, for example. The game behavior of user A for the game G1 is used to identify behavior metrics for the game G1 for the user A. The behavior metrics may identify helpful game hints or game video clips that can be provided to the user A to assist the user to improve his/her game skills. The game hints are generated based on the user A's game behavior in the game and are tailored for each portion of the game. The identified behavior metrics are associated with the game icon of game G1 at the user interface, as illustrated by bubble 'B1'. The behavior metrics presented at the user interface for each game are different for different users as the behavior metrics are identified based on the respective user's game behavior. Further, the behavior metrics provided for the player for the game are dynamically adjusted for different portions of the game so that game hints that are appropriate for each portion is presented as and when the user plays the respective portion of the game.

Figure 4B:
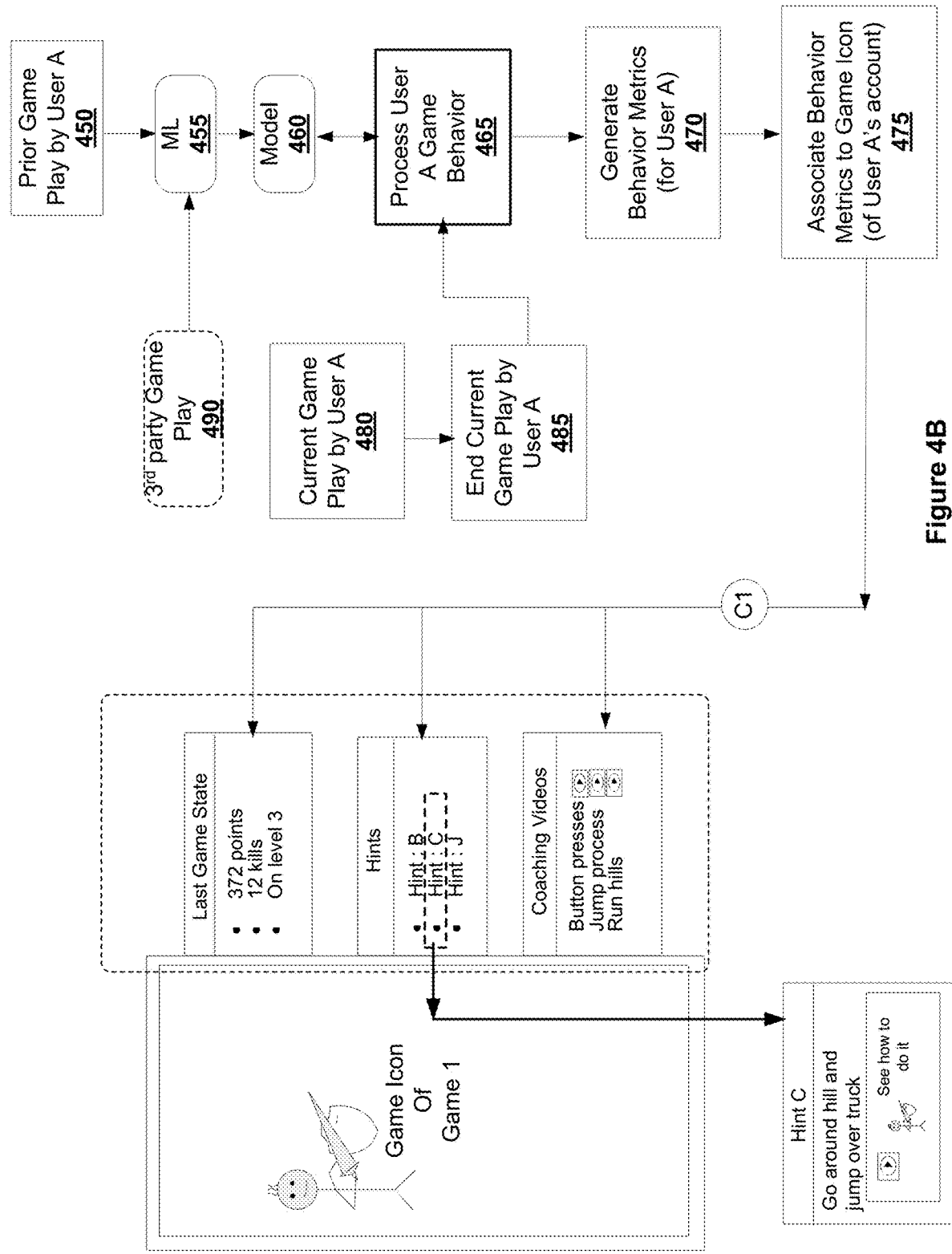
FIG. 4B illustrates a simple block diagram of a data flow process used to present behavior metrics for a user of a game at the user interface to assist the user in improving game play, in accordance with an alternate embodiment of the invention.

FIG. 4B illustrates flow of game data generated for a game, to provide behavior metrics on the user interface in accordance to an alternate embodiment. In this embodiment, data from prior game play(s) for a game selected by a user A for current game play, is identified, retrieved and provided to a machine learning logic (450) as input data, for analysis. The data from prior game play(s) includes user interactions provided by user A during one or more prior game sessions of game play of the game. The prior game play data for the user for the game may be stored in game play datastore 314 as metadata and includes in-game and out-of-game interactions provided during game play of the game. The game play data is retrieved by the game execution engine 310.2 by querying game data manager 310.6.

The game play data is analyzed by the machine learning logic (455) to generate a model 460 for the game for user A. The model uses the interactions provided by the user A at each step, each challenge, each portion, each level of the game to understand the user A's game behavior captured during game play of the game. Based on the understanding of user A's game behavior obtained from the model, the machine learning logic deduces user A's skills within the game, and A's strengths and weaknesses within the game. The strengths of user A may be deduced by determining how fast user A completes a challenge and what resources, inputs user A provided to overcome the challenge provided in a portion of the game. Faster completion of a challenge in a portion of the game by expending very little game resources may indicate that user A possesses greater skills to provide completion metric for the portion, slower or repeated unsuccessful attempts expending a lot of game resources may indicate that user A possesses sub-par skills to overcome the challenge posed in the portion of the game.

Based on the understanding of the game behavior, the game execution engine with the aid of machine learning logic may generate behavior metrics for different portions of the game that is specific to user A (470). In instances where the user A was able to overcome the challenges in a particular portion of the game, the behavior metrics may include a game clip of the game play of the user A completing the challenge. In other instances where user A is unable to overcome the challenges in a portion of the game after repeated attempts, the behavior metrics may include game inputs specified by the game logic for the portion of the game as game hints.

In some embodiments, the game execution engine may update the game model generated for the user to include interactions provided in the game play by third party users (490). In one embodiment, this is an optional step (as indicated by the broken box). In an alternate embodiment, the interactions from the game play by third party users may be included in the game model generated for user A for the game. When the interactions from third party users game play is to be included in the model, the machine learning logic analyzes the game interactions provided by the third party users to identify specific ones of the users that have successfully completed or achieved a completion metric, a sequence of events, actions, levels, moves, or combinations thereof for different portions of the game. The game play of the specific ones of the third party users is used to generate behavior metrics for the corresponding portions of the game for the user A. A collaborative filtering logic may be used to identify the third party users that played the game and to identify specific ones of the third party users that successfully completed or achieved a completion metric, a sequence of events, actions, levels, moves, etc., for the challenges in each portion of the game. Game play of the identified third party users is used to generate video clips and other game hints as part of behavior metrics for presenting to user A for the game. The behavior metrics are associated with a game icon of the game on the user interface (as illustrated by bubble 'C1'). In one embodiment, each of the different types of the behavior metrics is represented on the user interface using a distinct indicator. User interactions at any of the behavior metrics causes the hints, video clips or game state for the user or any other behavior metrics to be rendered on the user interface either alongside the game data during game play or alongside the game icon before the game play.

In one embodiment, the user A's current game play may be analyzed in real-time to determine the user's current game behavior (480). When the user completes the current game play (485), the user's current game play interactions may be provided as input to the machine learning logic to allow the machine learning logic to process the user A's current game play interactions and determine the user A's current game behavior (465). The current game behavior of user A may be updated to the model built for the user A for the game (460). The updated model may be used to refine the behavior metrics provided for the user for the game to reflect the current game behavior of user A. The refined behavior metrics are dynamically updated to the user interface so that when the user A restarts a paused game or starts the game from the beginning during a subsequent game play session, a more up-to-date and relevant behavior metrics are presented to user A.

FIG. 4B illustrates an example of user interaction at one of the behavior metrics available for the game 1 (G1). In this embodiment, the behavior metrics may identify a list of portions of the game that the user A might require assistance and present the list on the user interface before the game play starts. User interaction at one of the items in the Hints list (i.e., selection of Hint: C) would cause the game hint for Hint C to be rendered in a separate window or alongside the game content or in any other portion of the user interface, as illustrated in FIG. 4B. In an alternate embodiment, the hints may be presented during game play of the game such that a hint related to a specific portion is presented when the user A approaches the specific portion in the current game play.

FIG. 4B also identifies a sample of useful and relevant game hints and game state of the user for the game that is rendered in the user interface for user interaction. The game hints may include coaching videos, textual hints, game state, etc. The game hints may be provided in any format that can be rendered for a user. In one embodiment, the behavior metrics provided on the user interface are based on the user's preference. Fewer or more options may be provided based on the user's preference, user's game skills, user's game behavior, etc.

Figure 4C:
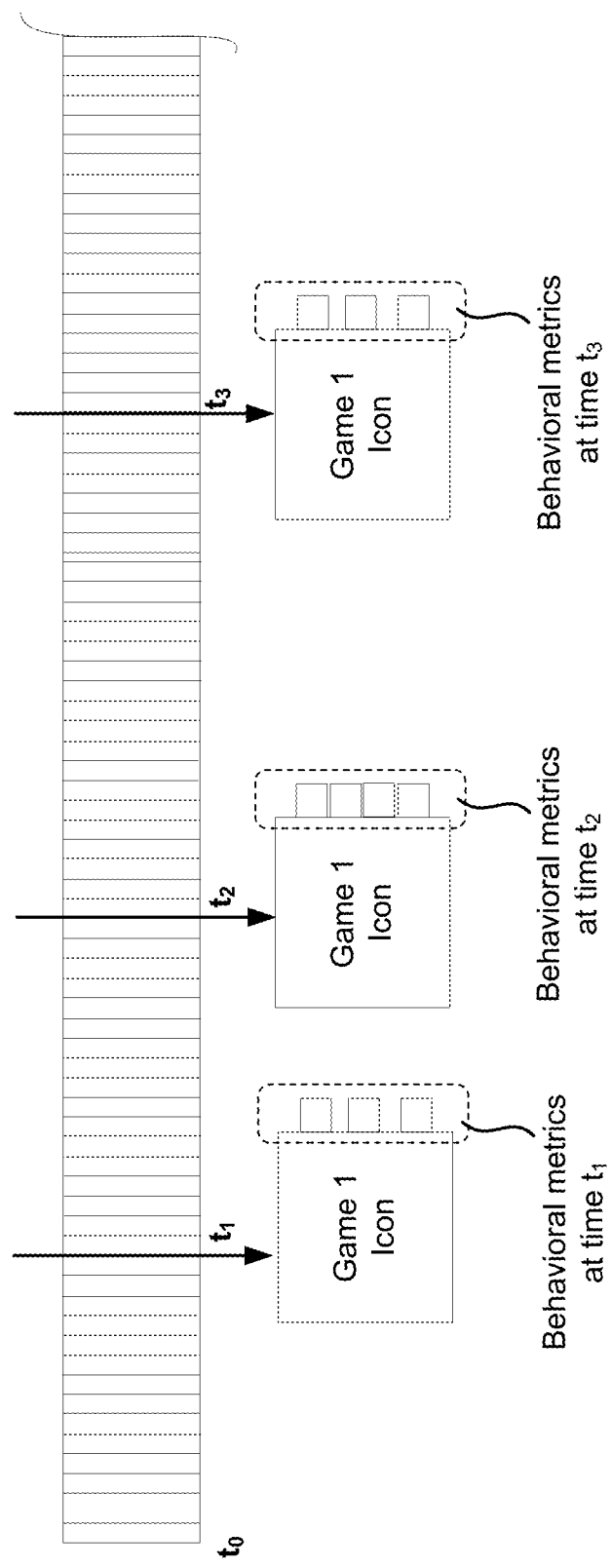
FIG. 4C illustrates a simple block diagram of dynamically changing behavior metrics based on portion of the game play that is currently rendering, in one embodiment of the invention.

FIG. 4C illustrates a simple example of behavior metrics provided to user A during current game play of the game. The game execution engine uses the analysis provided by the machine learning logic and collaborative filter logic to generate behavior metrics for the user to assist the user to improve the user's game play of the game. As shown in FIG. 4C, user A selects game G1 at the user interface for game play. At time $t_1$, the game execution engine may determine that user A is in a first portion of the game where he needs assistance in completing the portion. Based on this knowledge, the game execution engine identifies behavior metrics that are appropriate for the first portion of the game G1 and updates the user interface with the identified behavior metrics that is appropriate for the first portion to enable the user A to successfully complete or improve the game play of the first portion of the game G1. As the user A continues to play the game G1 and approaches a second portion of the game that he needs assistance in, the game execution engine may update the behavior metrics of game G1 that is appropriate to successfully complete or improve the game play of the second portion of the game G1. Similarly, at time t3, the user A is provided with behavior metrics that are appropriate to successfully complete or improve the game play of the third portion of the game G1. Although FIG. 4C illustrates same number of behavior metrics being rendered for different portions of the game, the number or type or sequence of behavior metrics available for different portions may vary. The variance in the behavior metrics may be based on the portion of the game, type of game, game behavior of the user, or behavior metrics available for the portion.

The various embodiments discussed herein provide relevant game hints and game-related options to enable the user to improve game play and or to view details of game play. The behavior metrics presented to the user are customized for the user for the game. In some embodiments, the behavior metrics provide a video clip of a last portion of the prior game play to acquaint the user of where he left off, various game playing hints that are provided from game logic and other game users game play to assist the user to master the moves and improve his/her game playing skills. Such interactive and dynamic assistance will alleviate the user's frustration and enhance the user's interest in the game. Other advantages may be apparent to one skilled in the art after reading the various embodiments described herein.

Figure 5A:
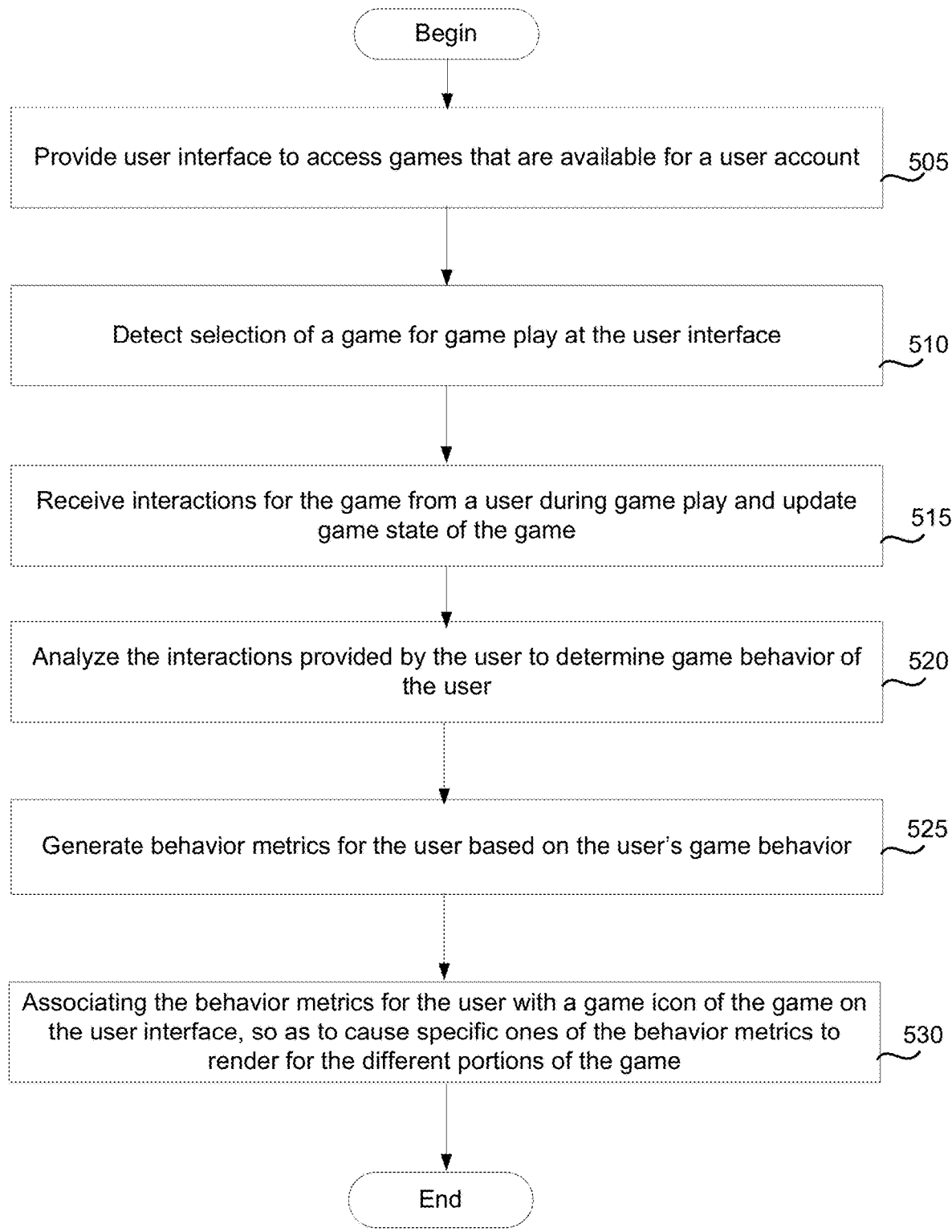
FIG. 5A illustrates an example flow of operations of a method used for providing details of a prior game play during current game play, in accordance with an embodiment of the invention.

FIG. 5A illustrates the various method operations used for providing details from a prior game play of a game, to a user, in one embodiment. The method begins at operation 505 wherein a user interface is provided to access games that are available to a user account on a cloud application system, such as cloud gaming system. The user account may provide access to a plurality of applications and services, including game applications, news service/application, music service/application, library service, radio service/application, streaming broadcast application, etc. User selection of a game from game application for game play is detected at the user interface provided at the client device, as illustrated in operation 510. The user interface may provide a list of various options that are available under each application. For example, the games that are available under game application may include games that were purchased for the user account, games that are free and games (e.g., mini-games) that are shared by other users. In response to detecting selection of the game for game play, a game server detects selection of the game and executes an instance of the game and generates game data. The game data is exchanged with the client device 100.

The user interacts with the game during game play. Interactions provided for the game by a user during game play is received and processed by the game server, as illustrated in operation 515. As part of the processing, the game server may update the game state of the game. The interactions provided by the user are analyzed by game logic of the game to determine game behavior of the user, as illustrated in operation 520. As part of the analysis, the game logic determines the various inputs provided by the user for each step, each level, each challenge, each portion of the game and determines the game behavior. The game behavior may identify the game skill of the user, the user's interest in the game, etc. Based on the game behavior of the user detected during game play of the game, the game logic may generate behavior metrics for the user, as illustrated in operation 525. The behavior metrics may identify game hints, game state, video clips, etc., for the user to assist the user to improve his/her game play.

The generated behavior metrics are associated with an icon of the game on the user interface, as illustrated in operation 530. The association causes the rendering of specific ones of the behavior metrics for different portions of the game, during game play. The behavior metrics are customized for the player for the game. The association causes the behavior metrics to be accessed either during the game play of the game or before starting game play of the game.

Figure 5B:
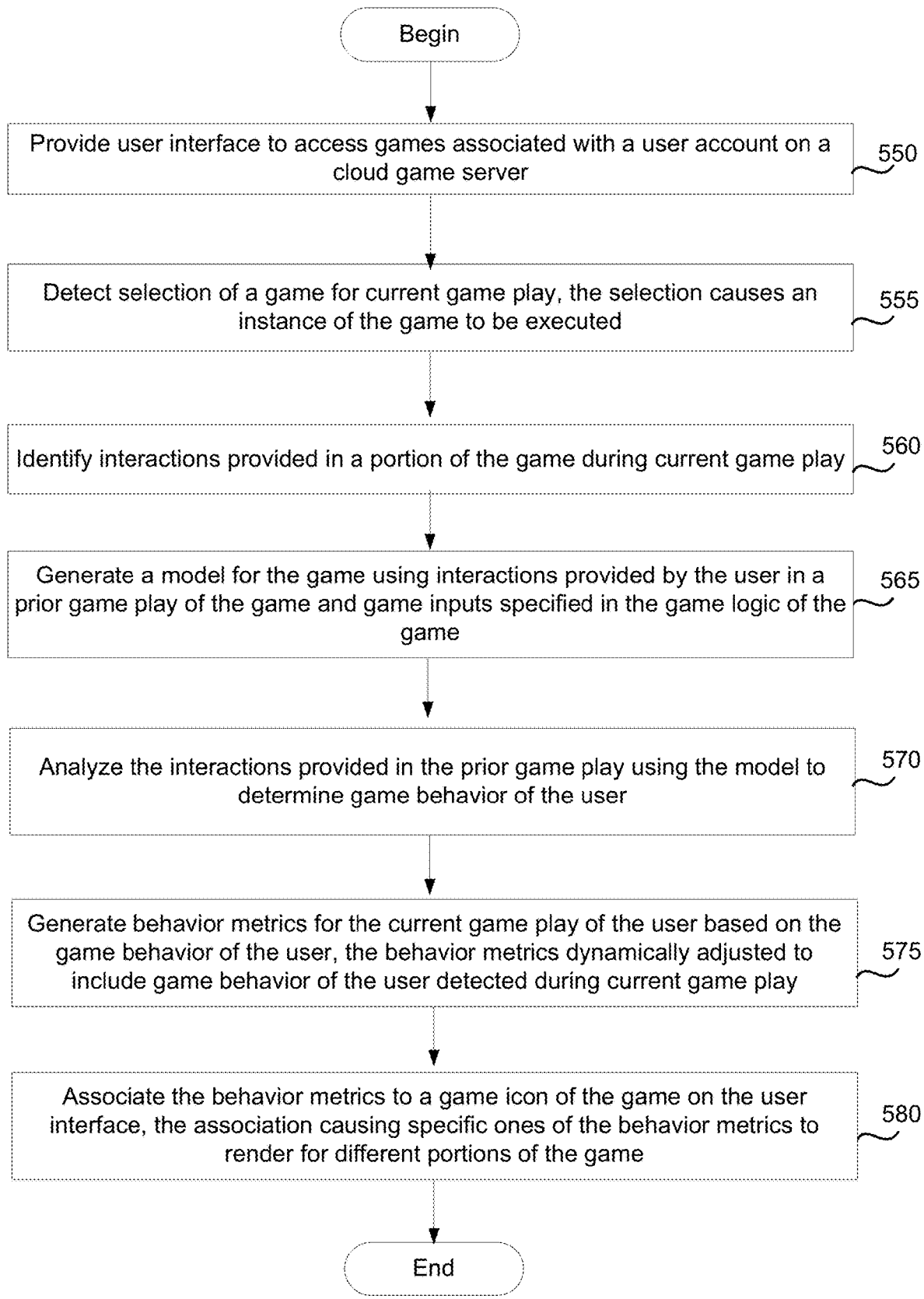
FIG. 5B illustrates an example flow of operations of a method used for providing details of a prior game play during current game play, in accordance with an alternate embodiment of the invention.

FIG. 5B illustrates various method operations used for providing behavior metrics for a user for a game, in an alternate embodiment of the invention. The method begins at operation 550, wherein a user interface is provided at a client device to access games that are available for a user account on a cloud game server. The user interface includes a list of interactive applications, including game applications that are available for the user account on the cloud game server including applications that were purchased for the user account, applications that are free and applications that are shared by social contacts of a user associated with the user account.

A selection of a game for game play made at the client device is detected at the cloud game server, as illustrated in operation 555. A signal identifying the selection is sent from the client device to the cloud game server and, in response, the cloud game server authenticates the request and executes an instance of the game for game play. User interactions provided in a portion of the game during current game play are identified and processed by the game logic executing on the cloud game server to affect an outcome of the game, as illustrated in operation 560.

A game model is generated for the game using interactions provided by the user in a prior game play of the game and game inputs specified by the game logic of the game, as illustrated in operation 565. The game model is generated using machine learning logic that identifies what interactions need to be provided at every step, every level and every session of the game, and what interactions the user provided during prior game play. The interactions provided by the user are analyzed using the model to determine the game behavior of the user. The analysis determines a deviance in the interactions of the user in relation to the game input specified in the game logic. The details from the analysis of the game model and the user behavior enable the game logic to determine if the user is having trouble completing a portion of the game.

The game logic then generates behavior metrics for the current game play of the user based on the game behavior of the user obtained from the prior game play, as illustrated in operation 575. The behavior metrics are dynamically adjusted by taking into consideration game behavior of the user detected during current game play. The behavior metrics provide game hints, video clips, etc., for the game from the game logic and from other users' game play.

The behavior metrics are associated with a game icon of the game provided on the user interface of the client device, as illustrated in operation 580. The behavior metrics may be accessed by the user using options provided on the user interface, at any time during game play or before game play of the game. The behavior metrics provide the user with game hints and assistance to improve the game play of the game. In addition to game hints and assistance, the behavior metrics may also include options to access other details from the prior game play of the game, such as game state, game play statistics, etc. These options provide the user with sufficient information to enable the user to understand the nuances of the game play and to assist the user to improve the game play of the game.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Figure 6:
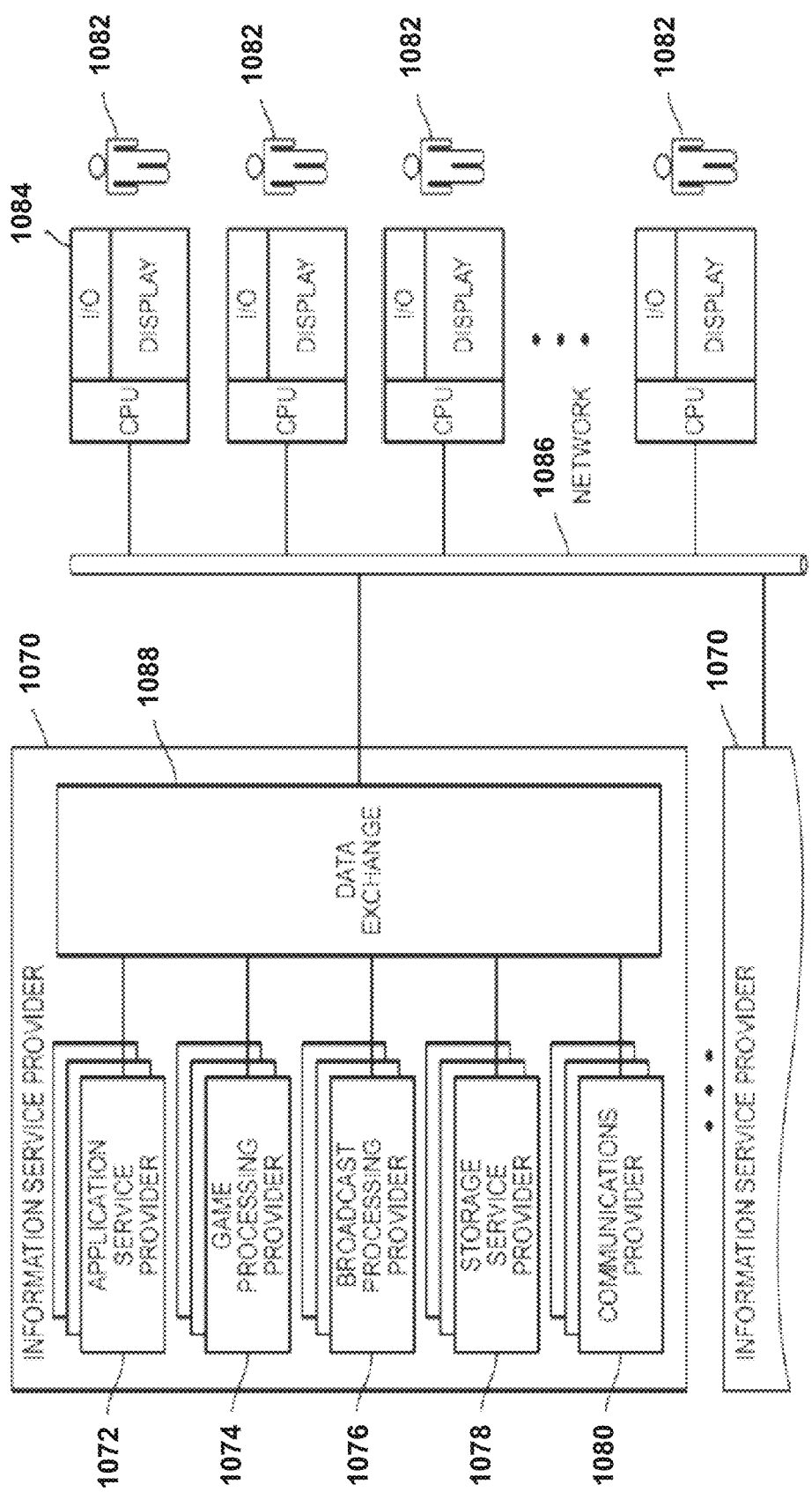
FIG. 6 illustrates an example Information Service Provider architecture for delivering informational content and services to users who are geographically dispersed and connected via network, in accordance with one embodiment of the present invention.

FIG. 6 illustrates an embodiment of an Information Service Provider architecture that may be used in providing access to different games. Information Service Providers (ISP) 1070 deliver a multitude of information services to users 1082 geographically dispersed and connected via network 1086. Although the various embodiments have been discussed with reference to providing fast access to games, the embodiments can be extended to provide one or more types of other services. For example, an ISP can deliver just one type of service, such as a game, or a variety of services such as games, stock price updates, broadcast media, news, sports, gaming, etc. Additionally, the services offered by each ISP may be dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data from the user's gaming or access profile to the new ISP through the connection module, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP (i.e., during switching of data center assigned to the user) as the client moves around the world and such transfer may be based on a compatibility of services provided by the respective ISPs to make the ISP in better position to service the user be the one that delivers these services.

ISP 1070 includes Application Service Provider (ASP) 1072, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on a vendor's system, for example, and is accessed by users through a web browser using HTML, or by special purpose client software provided by the vendor, or via other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1070 includes a Game Processing Server (GaPS) 1074 which is used by game clients to play single and multiuser video games. Most video games played over the Internet operate via a connection to a game server. Typically, games use a dedicated server application that collects data from users and distributes it to other users. This is more efficient and effective than a peer-to-peer arrangement, but it requires a separate server to host the server application. In another embodiment, the GaPS establishes communication between the users and their respective game-playing devices exchange information without relying on the centralized GaPS.

Dedicated GaPSs are servers which run independently of the client. Such servers are usually run on dedicated hardware located in data centers, providing more bandwidth and dedicated processing power. Dedicated servers are the preferred method of hosting game servers for most PC-based multiuser games. Massively multiuser online games run on dedicated servers usually hosted by the software company that owns the game title, allowing them to control and update content.

Broadcast Processing Server (BPS) 1076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1080 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1088 interconnects the several modules inside ISP 1070 and connects these modules to users 1082 via network 1086. Data Exchange 1088 can cover a small area where all the modules of ISP 1070 are in close proximity, or can cover a large geographic area when the different modules are geographically dispersed. For example, Data Exchange 1088 can include a fast Gigabit Ethernet (or faster) within a cabinet of a data center, or an intercontinental virtual area network (VLAN).

Users 1082 access the remote services with client device 1084, which includes at least a CPU, a memory, a display and I/O. The client device can be a PC, a mobile phone, a netbook, tablet, gaming system, a PDA, etc. In one embodiment, ISP 1070 recognizes the type of device used by the client and adjusts the communication method employed. In other cases, client devices use a standard communications method, such as HTML, to access ISP 1070.

Figure 7:
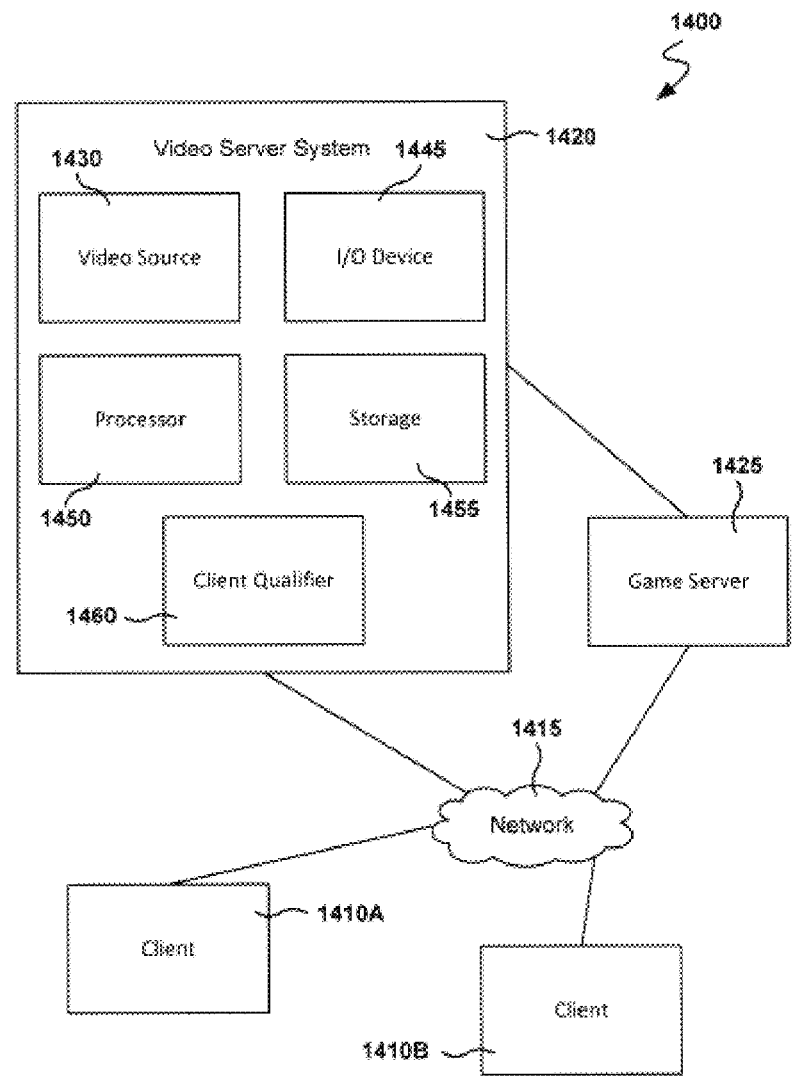
FIG. 7 illustrates a simplified block diagram of an example Game System, in accordance with various embodiments of the invention.

FIG. 7 is a block diagram of a Game System 1400, according to various embodiments of the invention. Game System 1400 is configured to provide a video stream to one or more Clients 1410 via a Network 1415. The Network is similar to the Network 200 illustrated in FIG. 1. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change instantly with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 1420 frames per second. Although higher or lower frame rates are included in alternative embodiments of the invention.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. The clients described are similar to clients 100-1 through 100-n of FIG. 1. Typically, Clients 1410 are configured to receive encoded video streams, decode the video streams, and present the resulting video to a user, e.g., a user of a game. The processes of receiving encoded video streams and/or decoding the video streams typically includes storing individual video frames in a receive buffer of the client. The video streams may be presented to the user on a display integral to Client 1410 or on a separate device such as a monitor or television. Clients 1410 are optionally configured to support more than one game user. For example, a game console may be configured to support two, three, four or more simultaneous users. Each of these users may receive a separate video stream, or a single video stream may include regions of a frame generated specifically for each user, e.g., generated based on each user's point of view. Clients 1410 are optionally geographically dispersed. The number of clients included in Game System 1400 may vary widely from one or two to thousands, tens of thousands, or more. As used herein, the term "game user" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415 (similar to Network 200 of FIG. 1). Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command. Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multiuser game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiuser game server that sends game state information to multiple clients, one of which is Video Server System 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and Storage 1455 (including non-transitory analog and/or digital storage devices). Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a user and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple users using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and an "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments, Video Source 1430 includes a video recording device such as a camera. This camera may be used to generate delayed or live video that can be included in the video stream of a computer game. The resulting video stream optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game user, images of other game users, video feeds of other game users (e.g., webcam video). In embodiments of Client 1410A including a touch screen interface or a gaze detection interface, the overlay may include a virtual keyboard, joystick, touch pad, and/or the like. In one example of an overlay a user's voice is overlaid on an audio stream. Video Source 1430 optionally further includes one or more audio sources.

In embodiments wherein Video Server System 1420 is configured to maintain the game state based on input from more than one user, each user may have a different point of view comprising a position and direction of view. Video Source 1430 is optionally configured to provide a separate video stream for each user based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, user identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1455 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

For purposes of providing example ways of processing learning algorithms, machine learning methods, predictions, data analysis, and the like, without limitations to any specifically claimed embodiment, reference may be made to a book entitled "*Introduction to Machine Learning*," Second Edition, by Ethem Alpaydin, The MIT Press (ISBN 978-0-262-01243-0), Cambridge, Mass., London England (2010), which is herein incorporated by reference for all purposes. Thus, references to learning and machine learning, can use any number of specific algorithms to identify similarities between player/user game performance, identify differences, identify how other players achieved specific game actions and/or game interactions, identify hints for the user to achieve specific tasks, actions, levels, goals, etc., in the game. The machine learning process may be executed locally on a game console, or can be processed on a server. In some embodiments, multiple servers or virtual machines may process one or more machine learning tasks, in order to speed up and dynamically expand the processing of actions of other users in a distributed gaming environment.

With the above embodiments in mind, it should be understood that the invention may employ various computer-implemented operations involving data stored in computer systems. These operations include operations requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable programming code on a computer-readable medium. Alternately, the computer readable programming code may be downloaded from a server using the data exchange interconnects described above. The computer-readable medium is any data storage device that can store data which can be thereafter read by a computer system, including an electromagnetic wave carrier. Examples of the computer-readable medium include hard drives, network attached storage (NAS), read-only memory, random-access memory, CD-ROMs, CD-Rs, CD-RWs, magnetic tapes, and other optical and non-optical data storage devices. The computer-readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
providing a user interface for a user account, the user interface used to access games available on a cloud game server;
detecting selection of a game presented on the user interface, the game selected for game play;
receiving interactions for the game from a user during game play, the interactions applied to affect an outcome of the game;
analyzing the interactions provided by the user to determine game play behavior of the user;
generating behavior metrics for the user based on the game play behavior of the user, the behavior metrics being different for different portions of the game based on the game play behavior of the user in respective portions of the game, the behavior metrics used to generate a game play model for the user and use the game play model to identify deviation in the game play behavior of the user in each of the different portions of the game that prevented the user from advancing in the respective portion and to identify game play hints for advancing in each of the different portions of the game, wherein the game play model is generated using machine learning logic;
associating the game play hints for the user with a game interface of the game so as to render selection options for accessing the game play hints to advance in the game,
wherein operations of the method are executed by a processor of the cloud game server.

2. The method of claim 1, wherein the game play model is updated using the game play behavior of a plurality of other users that have played the different portions of the game.

3. The method of claim 2, wherein determining deviation in the game play behavior further includes,
comparing interactions of the user for each portion of the game, using details from the game play model, with game inputs of one or more of the plurality of other users for the respective portion of the game to identify deviation in the game behavior, wherein the deviation resulting in the user not able to advance in the respective portion of the game.

4. The method of claim 2, wherein the game play model is updated with current game play of the game of the user and used during subsequent game play of the game, and
wherein the subsequent game play is a restart of the current game play after a pause operation or start of a new game session.

5. The method of claim 1, wherein operations of analyzing and generating are performed during game play of the user.

6. The method of claim 1, wherein detecting the selection of the game includes updating game play hints for the user on the user interface and rendering an image clip of a game state of a prior game play of the user at the user interface.

7. The method of claim 1, wherein the game play hints are provided in an audio format or a video format or a textual format or a graphical user interface format, or any two or more combinations thereof.

8. The method of claim 1, wherein generating behavior metrics further includes,
analyzing the game play behavior of the user from prior game play of the game to identify the deviation in the game play of the user; and
based on the deviation, providing the game play hints for the user for the portion of the game using details from the game play model, wherein the game play hints to the user include game inputs for advancing in the portion of the game.

9. The method of claim 1, wherein generating behavior metrics further includes,
updating the game play model for the game using the game behavior of a plurality of other users that played the game and the game behavior of the user from prior game play, the game play model used in computing behavior metrics of the user for different portions of the game by determining a deviation in the game behavior of the user for the different portions using details provided in the game play model.

10. The method of claim 9, wherein determining deviation in the game behavior for a portion further includes,
analyzing interactions provided by the plurality of other users and the user for the portion of the game to identify deviation in the game behavior of the user, using details from the game play model, wherein the interactions of each of the plurality of other users resulted in the respective one of the plurality of other users advancing in the portion of the game, and the interactions of the user resulting in the user not able to advance in the portion of the game.

11. The method of claim 9, wherein identifying game play hints further includes,
selecting game play of a specific other user of the plurality of other users that was used in generating the game play model, wherein game inputs provided by the specific other user resulted in successful completion of a portion of the game, the specific other user selected by matching at least a portion of a user profile of the specific other user with a corresponding portion of a user profile of the user; and
providing game play hints for the portion of the game using the game inputs provided for the portion of the game by the specific other user, the game play hints provided are customized for the user based on the game play behavior of the user, wherein the game play hints are provided in a video format or a textual format or an audio format, or a combination of any two or all of the video, textual and audio formats.

12. The method of claim 11, wherein providing the game play hints in video format includes providing a video clip for the portion of the game, the video clip extracted from a video recording of the game play of the specific other user.

13. The method of claim 1, wherein generating behavior metrics further includes,
updating the game play model for the game using the game behavior of a plurality of other users that played the game and the game behavior of the user from prior game play;
analyzing interactions provided by the plurality of other users and the user for a portion of the game to identify deviation in the game behavior of the user, the analyzing performed by comparing the interactions of the user with the interactions of the plurality of other users that achieved advancement in the portion of the game, using details from the game model;
selecting game play of a specific other user of the plurality of other users, the specific other user selected by matching at least a portion of a user profile of the specific other user with a corresponding portion of a user profile of the user; and providing game play hints for the portion of the game using game inputs provided for the portion of the game by the specific other user, the game play hints provided are customized for the user based on the game behavior of the user.

14. The method of claim 1, wherein the game selected for game play is a multi-player game played by a plurality of users, and wherein associating the game play hints causes the game play hints generated for each of the plurality of users to be rendered at the user interface of respective users.

15. The method of claim 1, wherein the game selected for game play is a multi-player game played by a plurality of users, wherein the user interface for each of the plurality of users includes an option to restart the game play of the game.

16. The method of claim 1, wherein the game play hints are presented in accordance to a presentation preference defined by the user, and wherein the user interface further includes an option to customize the game for game play, wherein the option to customize the game includes option to adjust speed of the game or a level of the game or a difficulty of the game.

17. A method, comprising:

providing a user interface to access games available for a user account on a cloud game server;

detecting selection of a game for current game play from the user interface of the user account;

identifying interactions provided by a user in different portions of the game during the current game play;

generating a model for the game using interactions provided in a prior game play of the game by the user, the model generated using machine learning logic;

analyzing the interactions provided in the prior game play using the model to determine game play behavior of the user;

identifying game play hints for the current game play of the user based on the game play behavior of the user in different portions of the game identified from the model, the game play hints based on deviation in the game play behavior of the user in the different portions, the model dynamically updated with the interactions of the user detected during current game play;

associating the game play hints for the user with a game interface of the game so as to render selection options for accessing the game play hints to advance in the different portions of game during current game play, wherein operations of the method are executed by a processor.

18. The method of claim 17, wherein generating the model further includes, updating the model with interactions provided by a plurality of other users that played the game.

19. The method of claim 18, wherein identifying game play hints further includes, identifying deviation in the game play behavior of the user for a portion of the game using the details from the model, the deviation identified by comparing the interactions of the user provided for the portion with the interactions of the plurality of other users that achieved results for the portion of the game;

selecting game play of a specific other user of the plurality of other users, the specific other user selected by matching skill level of the user with the skill level of the specific other user; and providing game play hints for the portion of the game using the game inputs provided for the portion of the game by the specific other user.

20. The method of claim 18, wherein the model being updated upon completion of prior game play session of respective one of the plurality of other users.

21. The method of claim 17, wherein the game play behavior of the current game play updated to the model upon detecting end of current game play or end of current game play session, the updated game play behavior of the user used in refining the game play hints for the user for the game during subsequent game play of the game.

22. The method of claim 17, wherein the model is dynamically updated with interactions provided by the user during current game play of the game, upon detecting the user exiting a game session of the current game play.

23. A server, comprising:

a processor; and a memory coupled to the processor, the memory used to store an application having programming logic, which when executed by the processor provides game play hints for the application based on behavior metrics, the programming logic of the application is configured to:

provide a user interface for a user account, wherein the user account is used to access applications available on the server;

detect selection of an application presented on the user interface, the application selected for user interaction;

receive user interactions for the application from a user during execution of the application, the user interactions applied to adjust an outcome of the application;

analyze the user interactions provided by the user to determine interactive behavior of the user;

generate behavior metrics for the user based on the interactive behavior of the user, the behavior metrics being different for different portions of the application based on the interactive behavior of the user in respective portions of the application, the behavior metrics used to generate an application model for the user, wherein the application model is used to identify deviation in the interactive behavior of the user in each of the different portions of the application that prevented the user from advancing in the respective portion and to identify application hints to advance in each of the different portions of the application, wherein the application model is generated using machine learning logic;

associate the application hints for the user with an application interface for the application so as to render selection options for accessing the application hints to allow the user to achieve advancement for the different portions of the application.

24. The system of claim 23, wherein the programming logic of the application is further configured to:

update the application model for the application using the interactive behavior of the user from prior application usage;

identify deviation in the interactive behavior of the user for a portion of the application using details from the application model for the respective portion of the application, wherein the deviation results in the user not achieving results specified for the portion of the application; and provide application hints for the portion of the application using details from the application model, the application hints provided to the user includes application inputs for advancing in the portion of the application.

25. The system of claim 23, wherein the programming logic of the application is further configured to:

update the application model for the application using the interactive behavior of a plurality of other users that interacted with the application and the interactive behavior of the user from prior application usage;

analyze interactions provided by the plurality of other users and the user for a portion of the application to identify deviation in the interactive behavior of the user for a portion of the application, the analyzing performed by comparing the user interactions of the user with the user interactions of the plurality of other users that achieved results for the portion of the application, using details from the application model;

select application interactions of a specific other user of the plurality of other users, the specific other user selected by matching at least a portion of a user profile of the specific other user with a corresponding portion of a user profile of the user; and provide application hints for the portion of the application using inputs provided for the portion of the application by the specific other user, the application hints that are provided are customized for the user based on the interactive behavior of the user for the portion.

* * * * *